United States Patent
Emokpae et al.

(10) Patent No.: US 12,514,465 B2
(45) Date of Patent: Jan. 6, 2026

(54) BILATERAL ACOUSTIC SENSING FOR PREDICTING FEV1/FVC

(71) Applicant: Lasarrus Clinic and Research Center Inc, Middle River, MD (US)

(72) Inventors: Lloyd Emokpae, Glen Burnie, MD (US); Roland N. Emokpae, Jr., Baltimore, MD (US)

(*) Notice: Subject to any disclaimer, the term of this patent is extended or adjusted under 35 U.S.C. 154(b) by 0 days.

(21) Appl. No.: 18/629,640

(22) Filed: Apr. 8, 2024

(65) Prior Publication Data
US 2024/0335136 A1 Oct. 10, 2024

Related U.S. Application Data

(60) Provisional application No. 63/457,926, filed on Apr. 7, 2023.

(51) Int. Cl.
*A61B 5/00* (2006.01)
*A61B 5/0255* (2006.01)
(Continued)

(52) U.S. Cl.
CPC .......... *A61B 5/0816* (2013.01); *A61B 5/0022* (2013.01); *A61B 5/0255* (2013.01); *A61B 5/0803* (2013.01); *A61B 5/0823* (2013.01); *A61B 5/091* (2013.01); *A61B 5/6823* (2013.01); *A61B 5/6831* (2013.01); *A61B 5/7267* (2013.01); *A61B 5/7282* (2013.01); *A61B 5/743* (2013.01); *G16H 15/00* (2018.01); *G16H 50/70* (2018.01); *G16H 80/00* (2018.01); *A61B 5/01* (2013.01); *A61B 5/0245* (2013.01);
(Continued)

(58) Field of Classification Search
CPC ... A61B 5/0816; A61B 5/0022; A61B 5/0255; A61B 5/091; A61B 5/01; A61B 5/0245; G16H 15/00; G16H 50/70; G16H 80/00
See application file for complete search history.

(56) References Cited

U.S. PATENT DOCUMENTS 8,340,740 B2 12/2012 Holzer et al.
8,547,982 B2 10/2013 Sultan et al.
(Continued)

FOREIGN PATENT DOCUMENTS

RU 2752137 C1 7/2021

OTHER PUBLICATIONS

Majumder AK. Computer Analysis of Frequency Spectrum of the Phonopulmogram. Proc Annu Symp Comput Appl Med Care. Nov. 5, 1980;1:266-71. PMCID: PMC2203739. (Year: 1980).*
(Continued)

*Primary Examiner* — Niketa Patel
*Assistant Examiner* — Skylar Lindsey Christianson
(74) *Attorney, Agent, or Firm* — U. Maryland Carey School of Law MIPLRC/IPEC

(57) ABSTRACT

A wearable system utilizing bilateral acoustic sensing for noninvasive monitoring and prediction of forced expiratory volume in one second (FEV1) and forced vital capacity (FVC) in patients with chronic obstructive pulmonary disease (COPD). The system collects and analyzes breathing sounds from both lungs, extracts relevant passive acoustic features, and employs machine learning algorithms to predict FEV1 or FVC values without requiring the subject to perform any forced expiratory maneuvers.

20 Claims, 15 Drawing Sheets

(51) Int. Cl.
    *A61B 5/08*         (2006.01)
    *A61B 5/091*      (2006.01)
    *G16H 15/00*      (2018.01)
    *G16H 50/70*      (2018.01)
    *G16H 80/00*      (2018.01)
    *A61B 5/01*        (2006.01)
    *A61B 5/0245*     (2006.01)

(52) U.S. Cl.
    CPC . *A61B 2560/045* (2013.01); *A61B 2562/0204* (2013.01); *A61B 2562/0219* (2013.01); *A61B 2562/043* (2013.01)

(56) References Cited

U.S. PATENT DOCUMENTS

| | | |
|---|---|---|
| 9,582,072 B2 | 2/2017 | Connor |
| 9,687,208 B2 | 6/2017 | Tsai et al. |
| 9,888,868 B2 | 2/2018 | Sarrafzadeh et al. |
| 10,028,675 B2 | 7/2018 | Patel et al. |
| 10,327,698 B2 | 6/2019 | Biswas et al. |
| 10,456,604 B2 | 10/2019 | Cheatham, III et al. |
| 10,542,889 B2 | 1/2020 | Ramesh et al. |
| 10,661,010 B1 | 5/2020 | Tsinberg |
| 10,671,838 B1 | 6/2020 | Bogan, III et al. |
| 10,709,353 B1 | 7/2020 | McLane |
| 10,720,151 B2 | 7/2020 | Sypniewski et al. |
| 10,765,399 B2 | 9/2020 | Emmanouilidou et al. |
| 10,898,160 B2 | 1/2021 | Spina et al. |
| 10,966,681 B2 | 4/2021 | Datta et al. |
| 11,089,995 B2 | 8/2021 | Mlynczak et al. |
| 11,145,400 B1 | 10/2021 | Neumann |
| 11,179,060 B2 | 11/2021 | Odame et al. |
| 11,272,864 B2 | 3/2022 | Dwarika |
| 11,307,064 B2 | 4/2022 | Choi et al. |
| 11,308,619 B2 | 4/2022 | Sainz de Cea et al. |
| 11,484,211 B2 | 11/2022 | Shallom |
| 2008/0281220 A1 | 11/2008 | Sharifpour |
| 2009/0131758 A1 | 5/2009 | Heywood et al. |
| 2011/0034818 A1 | 2/2011 | Gat et al. |
| 2011/0125044 A1 | 5/2011 | Rhee et al. |
| 2012/0283598 A1 | 11/2012 | Horii et al. |
| 2013/0030258 A1 | 1/2013 | Cheung et al. |
| 2014/0126732 A1 | 5/2014 | West et al. |
| 2015/0351690 A1 | 12/2015 | Toth et al. |
| 2017/0143977 A1 | 5/2017 | Kaib et al. |
| 2017/0156680 A1 | 6/2017 | Barretto et al. |
| 2017/0157430 A1 | 6/2017 | Cheatham, III et al. |
| 2017/0161451 A1* | 6/2017 | Weinstein .............. G08B 21/02 |
| 2017/0231528 A1 | 8/2017 | Nathan |
| 2017/0347969 A1 | 12/2017 | Thakur et al. |
| 2018/0035901 A1 | 2/2018 | Cronin et al. |
| 2018/0047200 A1 | 2/2018 | O'Hara et al. |
| 2018/0139518 A1 | 5/2018 | Touma et al. |
| 2019/0076080 A1 | 3/2019 | Prado |
| 2019/0088367 A1 | 3/2019 | Stamatopoulos et al. |
| 2019/0134396 A1 | 5/2019 | Toth et al. |
| 2019/0151640 A1 | 5/2019 | Weber et al. |
| 2019/0167176 A1 | 6/2019 | Annoni et al. |
| 2019/0167927 A1 | 6/2019 | Dagnello et al. |
| 2019/0231262 A1 | 8/2019 | Nasry |
| 2019/0266491 A1 | 8/2019 | Gao et al. |
| 2019/0266723 A1 | 8/2019 | Blanchard et al. |
| 2019/0298987 A1 | 10/2019 | Freeman et al. |
| 2019/0302460 A1 | 10/2019 | Kaul et al. |
| 2019/0365263 A1 | 12/2019 | Raj et al. |
| 2020/0093459 A1 | 3/2020 | Rahman et al. |
| 2020/0183047 A1 | 6/2020 | Denli et al. |
| 2021/0034921 A1 | 2/2021 | Pinkovich et al. |
| 2021/0043321 A1 | 2/2021 | Deterding et al. |
| 2021/0045656 A1 | 2/2021 | Rahman et al. |
| 2021/0113099 A1 | 4/2021 | Rogers et al. |
| 2021/0128074 A1 | 5/2021 | Leydon |
| 2021/0169326 A1 | 6/2021 | Emokpae |
| 2021/0275023 A1 | 9/2021 | Kalantarian et al. |
| 2021/0315480 A1 | 10/2021 | Odame et al. |
| 2021/0345939 A1* | 11/2021 | Jumbe .................... H04R 1/028 |
| 2021/0353244 A1 | 11/2021 | Kielyet al. |
| 2021/0369232 A1 | 12/2021 | Chen et al. |
| 2021/0398683 A1 | 12/2021 | Clifford et al. |
| 2021/0402212 A1 | 12/2021 | Schupp et al. |
| 2022/0005601 A1 | 1/2022 | Cox et al. |
| 2022/0068476 A1 | 3/2022 | Link et al. |
| 2022/0122728 A1 | 4/2022 | Wahl et al. |
| 2022/0248966 A1 | 8/2022 | Freeman et al. |
| 2022/0359070 A1 | 11/2022 | Lalouani et al. |
| 2022/0409904 A1 | 12/2022 | Brouns et al. |
| 2023/0008860 A1 | 1/2023 | Emokpae et al. |
| 2023/0074574 A1 | 3/2023 | Emokpae et al. |
| 2023/0177217 A1 | 6/2023 | Hughes |
| 2023/0225695 A1 | 7/2023 | Dodson et al. |
| 2023/0270350 A1 | 8/2023 | Shouldice et al. |

OTHER PUBLICATIONS

Kemalasari et al, Medical Spirometer for Diagnosing COPD Base On The Measurement of FVC and FEV1, 2020 J. Phys.: Conf. Ser. 1569 032061 (Year: 2020).*

Altan, G., Kutlu, Y., & Allahverdi, N. (2019). Deep learning on computerized analysis of chronic obstructive pulmonary disease. *IEEE journal of biomedical and health informative*, 24(5), 1344-1350.

Bhalla, 5., Liaqat, S., Wu, R., Gershon, A. S., de Lara, E., & Mariakakis, A. (2023). PulmoListener: Continuous Acoustic Monitoring of Chronic Obstructive Pulmonary Disease in the Wild. *Proceedings of the ACM on the Interactive, Mobile, Wearable and Ubiquitous Technologies*, 7(3), 1-24.

Darwish, A., & Hassanien, A. E. (2011). Wearable and implantable wireless sensor network solutions for healtncare monitoring. Sensors, 11(6), 5561-5595.

Emokpae, L. E., Emokpae Jr., R. N., Bowry, E., Bin Saif, J., Mahmud, M., Lalouani, W., . . . & Joyner Jr., R. L. (2022). Awearable multi-modalacoustic system for breathing analysis. *The Journal of the Acoustical Society of America*, 151 (2), 1033-1038.

Fernandez-Granero, M. A., Sanchez-Morillo, D., & Leon-Jimenez, A. (2015). Computerised analysis of telemonitored respiratory sounds for predicting acute exacerbations of COPD. *Sensors*, 15(10), 26978-26996.

Frerichs, I., Paradiso, R., Kilintzis, V., Rocha, B. M., Braun, F., Rapin, M., . . . & Wacker, J. (2023). Wearable pulmonary monitoring system with integrated functional lung imaging and chest sound recording: a clinical investigation in healthy subjects. *Physiological Measurement*, 44(4), 045002.

Hawthorne, G., Greening, N., Esliger, D., Briggs-Price, S., Richardson, M., Chaplin, E., . . . & Orme, M. W. (2022). Usability of wearable multiparameter technology to continuously monitor free-living vital signs in people living with chronic obstructive pulmonary disease: prospective observational study. *JMIR Human Factors*, 9(1), e30091.

Hsu, F.S., Huang, S. R., Huang, C. W., Huang, C. J., Cheng, Y. R., Chen, C. C., . . . & Lai, F. (2021). Benchmarking of eight recurrent neural network variants for breath phase and adventitious sound detection on a self-developed open-access lung sound database—HF_Lung_V1. PLoS *One*, 16(7), e0254134.

Islam, B., Rahman, M. M., Ahmed, T., Ahmed, M. Y., Hasan, M. M., Nathan, V., . . . & Gao, J. A. (2021). BreathTrack: detecting regular breathing phases from unannotated acoustic data captured by a smartphone. *Proceeding of the ACM on Interactive, Mobile, Wearable and Ubiquitous Technologies*, 5(3), 1-22.

Kaul S. Remap-West-Flare—FLAg for Review Efficacy Investigation REMAPWESTFLARE). Feb. 2023 Report No. NCT05745155.

Pervez Khan, M. A. H., & Kwak, K. S. (2009). Medical applications of wireless body area networks. International *Journal of Digital Content Technology and its Applications*, 3(3), 185-93.

Kumar, A., Mitra, V., Oliver, C., Ullal, A., Biddulph, M., & Mance, I. (2021, November). Estimating respiratory rate from breath audio obtained through wearable microphones. In 2021 43rd Annual

(56) References Cited

OTHER PUBLICATIONS

International Conference of the IEEE Engineering in Medicine & Biology Society (EMBC) (pp. 7310-7315). IEEE.

Lalouani, W., Younis, M., Emokpae Jr, R. N., & Emokpae, L.E. (2022). Enabling effective breathing sound analysis for automated diagnosis of lung diseases. Smart Health, 26, 100329.

Larson, E. C., Goel, M., Boriello, G., Heltshe, S., Rosenfeld, M., & Patel, S. N. (Sep. 2012). SpiroSmart: using a microphone to measure lung function on a mobile phone. In *Proceedings of the 2012 ACM Conference on ubiquitous computing* (pp. 280-289).

Lee, S. H., Kim, Y.S., Yeo, M. K., Mahmood, M., Zavanelli, N., Chung, C., . . . & Yeo, W. H. (2022). Fully portable continuous real-time auscultation with a soft wearable stethoscope designed for automated disease diagnosis. *Science Advances*, 8(21), eabo5867.

Lewandowski, M., Płaczek, B., & Bernas, M. (2020). Classifier-based data transmission reduction in wearable sensor network for human activity monitoring. Sensors, 21(1), 85.

Liao, X., Wu, Y., Jiang, N., Sun, J., Xu, W., Gao, S., . . . & Li, Q. (2023). Automated detection of abnormal respiratory sound from electronic stethoscope and mobile phone using MobileNetV2. *Biocybernetics and Biomedical Engineering*, 43(4), 763-775.

Messner, E., Fediuk, M., Swatek, P., Scheidl, S., Smolle-Jüttner, F. M., Olschewski, H., & Pernkopf, F. (2020). Multi-channel lung sound classification with convolutional recurrent neural networks. Computers *in Biology and Medicine*, 122, 103831.

Rahman, M. M., Ahmed, T., Nemati, E., Nathan, V., Vatanparvar, K., Blackstock, E., & Kuang, J. (Mar. 2020). Exhalesense: Detecting high fidelity forced exhalations to estimate lung obstruction on smartphones. In *2020 IEEE International Conference on Pervasive Computing and Communications (PerCom)* (pp. 1-10). IEEE.

Tayeh, G. B., Makhoul, A., Laiymani, D., & Demerjian, J. (2018). A distributed real-time data prediction and adaptive sensing approach for wireless sensor networks. Pervasive *and Mobile Computing*, 49, 62-75.

Viswanath, V., Garrison, J., & Patel, S. (Jul. 2018). SpiroConfidence: determining the validity of smartphone based spirometry using machine learning. In *2018 40th Annual International Conference of the IEEE Engineering in Medicine and Biology Society (EMBC)* (pp. 5499-5502). IEEE.

Vito, D. (2012). A new system for tailoring and monitoring mechanical ventilation by a wearable device at home, Chapter 3, "Materials and Methods." Downloaded Jun. 10, 2024 from https://www.politesi.polimi.it/bitstream/10589/65161/5/2012_10_Vito.pdf.

Wu, L., & Li, L. (Jul. 2020). Investigating into segmentation methods for diagnosis of respiratory diseases using adventitious respiratory sounds. In 2020 *42nd Annual International Conference of the IEEE Engineering in Medicine & Biology Society (EMBC)* (pp. 768-771). IEEE.

Xie, W., Hu, Q., Zhang, Q. (2023). EarSpiro: Earphone-based Spirometry for Lung Function Assessment. *Proceedings of the ACM on Interactive, Mobile, Wearable and Ubiquitous Technologies*, 6(4), 1-27.

Xu, W., Huang M. C., Liu, J. J., Ren, F., Shen, X., & Sarrafzadeh, M. (May 2013). mCOPD: mobile phone based lung function diagnosis and exercise system for COPD. In *Proceeding of the 6th International Conference on PErvasive Technologies Related to Assistive Environments* (pp. 1-8).

Zubaydi, F., Sagahyroon, A., Aloul, F., Mir, H., & Mahboub, B. (Dec. 2020). Using mobiles to monitor respiratory diseases. In *Informatics* (vol. 7, No. 4, p. 56). MDPI.

Trivedy, Sudipto, Manish Goyal, and Anirban Mukherjee. "Microphone based Smartphone enabled Spirometry Data Augmentation using Information Maximizing Generative Adversarial Network." 2020 IEEE International Instrumentation And Measurement Technology Conference (I2MTC). IEEE, 2020.

\* cited by examiner

BILATERAL ACOUSTIC SENSING FOR PREDICTING FEV1/FVC

CROSS-REFERENCES TO RELATED APPLICATIONS

This application claims the benefit of U.S. Provisional Application Ser. No. 63/457,926, filed Apr. 7, 2023, and is related to co-pending U.S. application Ser. No. 17/897,776, filed Aug. 29, 2022, the contents of each hereby incorporated by reference.

BACKGROUND OF INVENTION

Field of the Invention

Chronic obstructive pulmonary disease (COPD) is a progressive lung disease characterized by airflow limitation, persistent respiratory symptoms, and chronic inflammation [1]. COPD is a major cause of morbidity and mortality worldwide, and its prevalence is expected to increase in the coming years due to an aging population and continued exposure to risk factors, such as tobacco smoke and air pollution [11]. The disease is associated with significant healthcare costs and poses a substantial burden on patients, caregivers, and healthcare systems [34]. Accurate and timely monitoring of COPD progression is essential for effective management, early intervention, and prevention of exacerbations or other complications [22].

Description of Related Art

Traditional methods for assessing lung function, such as spirometry, require patients to perform forced expiratory maneuvers in a clinical setting, which can be challenging for some individuals, particularly those with severe COPD [1]. Additionally, these methods may not be readily accessible in remote settings or for patients with limited mobility. Consequently, there is a growing interest in developing noninvasive, user-friendly technologies that enable continuous monitoring of lung function in patients with COPD [35].

SUMMARY OF INVENTION

In an aspect of the present invention, the benefits of bilateral acoustic sensing are combined with other modalities, such as accelerometers, to provide additional data on the patient's activity levels and posture [35]. This integration allows for a more holistic and accurate view of the patient's respiratory health, enabling the detection of changes in breathing patterns that may not be apparent from other methods, such as visual observation or pulse oximetry. The present inventors have found that bilateral acoustic sensing innovation is particularly useful in patients with COPD, allowing for the detection of subtle changes in breathing patterns that can indicate exacerbations or other complications, leading to better outcomes and more efficient use of healthcare resources. In one aspect, a wearable system is provided and can be easily incorporated into the daily lives of patients, promoting patient engagement and adherence to treatment plans.

In an aspect of the present invention, there is a wearable system that utilizes bilateral acoustic sensing for noninvasive monitoring and prediction of forced expiratory volume in one second (FEV1) and forced vital capacity (FVC) in patients with COPD [1]. By sensing and analyzing breathing sounds from both lungs, the system may provide a comprehensive view of the patient's breathing patterns and extract relevant passive acoustic features that can be used to predict FEV1 or FVC without requiring the subject to perform any forced expiratory maneuvers [22]. In an aspect of the invention, the benefits of bilateral acoustic sensing are combined with other modalities, such as accelerometers, to provide additional data on the patient's activity levels and posture [35]. This integration allows for a more holistic and accurate view of the patient's respiratory health, enabling the detection of changes in breathing patterns that may not be apparent from other methods, such as visual observation or pulse oximetry.

The wearable system can be easily incorporated into the daily lives of patients, promoting patient engagement and adherence to treatment plans. The present invention has the potential to significantly improve management of COPD in remote settings and revolutionize the way healthcare providers monitor and care for patients with this chronic respiratory disease [1]. Aspects of the invention can facilitate early intervention to prevent exacerbations or other complications, thereby enhancing the quality of life for patients and reducing healthcare costs [34].

In some aspects, the techniques described herein relate to a system for noninvasive monitoring and prediction of lung function in a patient with chronic obstructive pulmonary disease (COPD), the system including: first and second sensors wearable by the patient proximate to a left lung and a right lung of the patient, respectively, each sensor including: an acoustic sensor configured to produce an acoustic signal based on sounds in an environ of the acoustic sensor, an inertial change sensor configured to produce an inertial change signal based on a change in inertia of the inertial change sensor, a microprocessor coupled to the acoustic sensor and inertial change sensor, configured to process the acoustic signal into phonocardiogram data and the inertial change signal into z-axis data, said data including sensor data, and a wireless communication module coupled to the microprocessor, configured to transmit sensor data via a communications channel; and a remote server, configured to receive the sensor data from each of the first and second sensors via the communications channel and configured with a machine learning (ML) algorithm to perform feature extraction and prediction of a forced expiratory volume in one second (FEV1) and a forced vital capacity (FVC) of the patient based on the sensor data from each of the first and second sensors.

In some aspects, the techniques described herein relate to a system, wherein the remote server is further configured to compute a phonopulmogram (PPLG) waveform by combining the phonocardiogram data and the z-axis data from the first and second sensors and to generate a representation of respiratory cycles and I:E ratios of the patient.

In some aspects, the techniques described herein relate to a system, wherein the prediction of FEV1 and FVC are based on the PPLG waveform, I:E ratios, and acoustic features extracted from the phonocardiogram data, according to the equation: $FEV1/FVC = b0 + b1 \cdot RR + b2 \cdot ID + b3 \cdot ED + b4 \cdot AFV + b5 \cdot DP + b6 \cdot SC + b7 \cdot SB$.

In some aspects, the techniques described herein relate to a system, wherein the acoustic sensor includes one microphone or an array of microphones.

In some aspects, the techniques described herein relate to a system, wherein the inertial change sensor includes a 3-axis accelerometer or a plurality of accelerometers.

In some aspects, the techniques described herein relate to a system, wherein the first and second sensors are adaptable for continuous monitoring in clinic and nonclinic settings.

In some aspects, the techniques described herein relate to a system, wherein the remote server is further configured to determine breathing pattern changes over a selectable period of time, where the selectable period of time may be selectable from periods of days, weeks, months, and years, or bounded by a specified start date and by a specified end date.

In some aspects, the techniques described herein relate to a system, wherein the remote server is further configured to identify exacerbated conditions related to the patient's COPD, including increased cough, shortness of breath, and changes in sputum production.

In some aspects, the techniques described herein relate to a system, wherein the ML algorithm is trained using spirometry data from multiple individuals with varying levels of COPD severity and/or the ML algorithm is trained using data gathered during a spirometry session of the patient.

In some aspects, the techniques described herein relate to a system, wherein the remote server is further configured to provide a reinforcement learning agent, trained to identify relevant features in the patient's sensor data for monitoring daily activities of the patient, and the identified features are used to develop a personalized model for the patient.

In some aspects, the techniques described herein relate to a system, wherein a reinforcement learning agent of the ML algorithm is rewarded for accurately predicting daily activities of the patient based on the data collected from the first and second acoustic sensors using a Q-learning algorithm.

In some aspects, the techniques described herein relate to a system, wherein the personalized model for the patient is continuously updated using learning algorithms based on data collected from the wearable first and second acoustic sensors.

In some aspects, the techniques described herein relate to a system, wherein the remote server is further configured to determine and transmit a comprehensive assessment of the patient's functional status derived from the sensor data of the patient to a health care provider's dashboard.

In some aspects, the techniques described herein relate to a system, further including a patient mobile device configured with a portal app to provide the patient with real-time feedback and visualizations of lung metrics, including real-time FEV1/FVC, I:E Ratio, RR, and HR outputs based on the sensors' data.

In some aspects, the techniques described herein relate to a method for monitoring and prediction of lung function in a patient with chronic obstructive pulmonary disease (COPD) including the steps of: providing first and second sensors wearable by the patient proximate to a left lung and a right lung of the patient, respectively, each sensor including: an acoustic sensor configured to produce an acoustic signal based on sounds in an environ of the acoustic sensor, an inertial change sensor configured to produce an inertial change signal based on a change in inertia of the inertial change sensor, a microprocessor coupled to the acoustic sensor and inertial change sensor, configured to process the acoustic signal into phonocardiogram data and the inertial change signal into z-axis data, said data including sensor data, and a wireless communication module coupled to the microprocessor, configured to transmit sensor data via a communications channel; transmitting the sensor data, by each of the wireless communications modules of the first and second sensors; receiving, by a remote server, the sensor data from each of the first and second sensors via the communications channel; processing, by the remote server, the sensor data with a machine learning (ML) algorithm to perform feature extraction and to predict a value representing a forced expiratory volume in one second (FEV1) and forced vital capacity (FVC) of the patient.

In some aspects, the techniques described herein relate to a method further including a step of transmitting the patient's predicted FEV1 and FVC to a healthcare provider's device.

In some aspects, the techniques described herein relate to a method where said step of analyzing includes a machine learning algorithm analyzing collected data to extract relevant passive acoustic features and predict forced expiratory volume in one second (FEV1) and forced vital capacity (FVC).

In some aspects, the techniques described herein relate to a method further including a step of training the ML algorithm with spirometry data from multiple individuals with varying levels of COPD severity.

In some aspects, the techniques described herein relate to a method further including a step of training the ML algorithm with data gathered during a spirometry session of the patient.

In some aspects, the techniques described herein relate to a method further including encrypting the sensor data prior to the transmitting step to create encrypted sensor data and decrypting the encrypted sensor data after the receiving step.

In some aspects, the techniques described herein relate to a method further including steps of determining breathing patterns changes or indicated exacerbations in the patient and transmitting the results of the determination step to a healthcare provider's device.

In some aspects, the techniques described herein relate to a method further including steps of determining a functional status of the patient and transmitting the result of the determination step to a healthcare provider's device.

In some aspects, the techniques described herein relate to a method where said step of transmitting includes integration with electronic health record systems.

In some aspects, the techniques described herein relate to a method, further including a step of providing the patient a portal app for execution on a patient mobile device, said portal app configured provide the patient with real-time feedback and visualizations of lung metrics based on the sensors' data.

DETAILED DESCRIPTION

Reference will now be made in detail to exemplary embodiments, discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

Aspects of the present invention provide for a state-of-the-art wearable system designed for noninvasive monitoring and prediction of lung function in patients with chronic obstructive pulmonary disease (COPD). The system utilizes advanced bilateral acoustic sensing technology, which enables simultaneous recording and analysis of breathing sounds from both the left and right lungs, providing a comprehensive and accurate assessment of the patient's respiratory health. This wearable technology is designed to be user-friendly, comfortable, and adaptable to various patient needs, making it suitable for continuous monitoring in both clinical and remote settings.

Figure 1A:
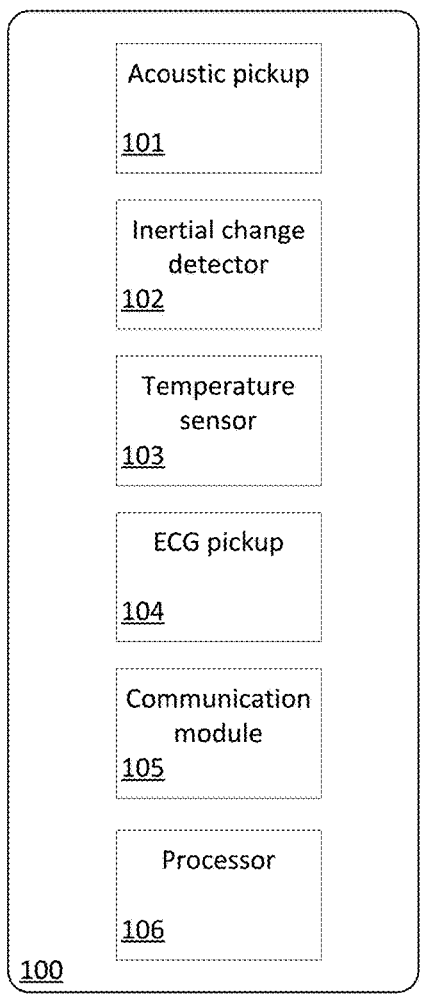
FIG. 1A schematically illustrates a sensor node in accordance with an aspect of the invention.
Figure 1B:
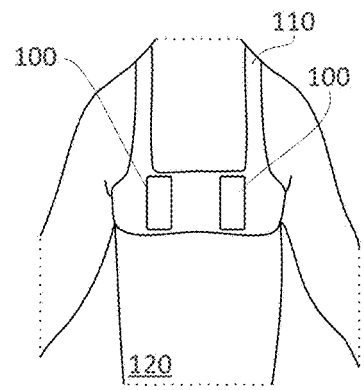
FIG. 1B illustrates placement of sensor nodes on a patient's torso in accordance with an aspect of the invention.
Figure 2A:
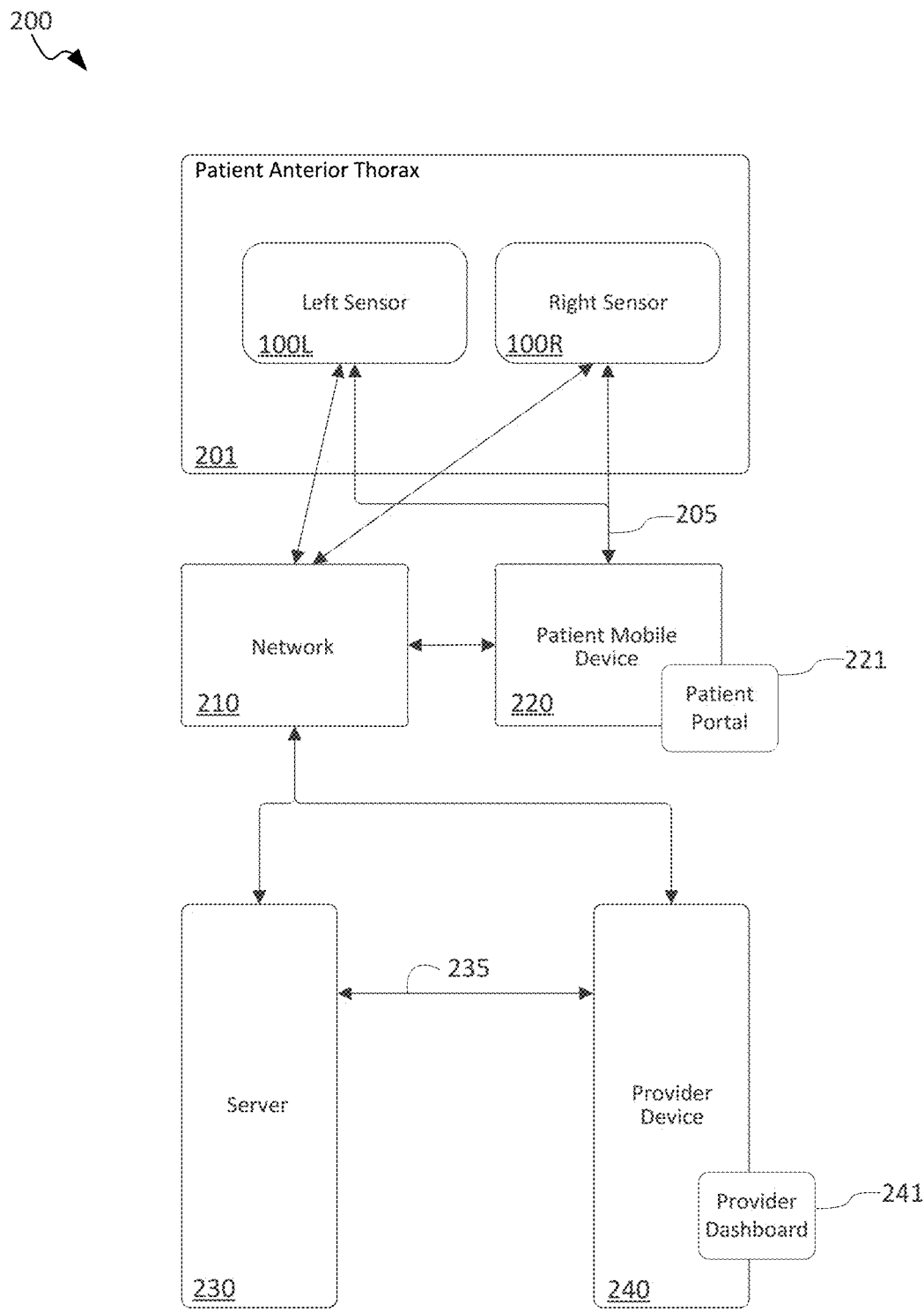
FIG. 2A illustrates a system schematic in accordance with embodiments of the invention.

With reference to FIGS. 1A and 1B and 2A, aspects of the system 200 can comprise several components such as a sensor node 100 having an acoustic pickup 101 such as an array of microphones, an inertial change or position detector(s) 102 such as accelerometers, a temperature sensor 103, an ECG pickup 104, a microprocessor for data acquisition and processing 106, and a communication module 105 for transmitting the collected data to a remote server 230 or a healthcare provider's device 240 via a network 210. Communication module 105 may, in one embodiment, be configured to provide wired and wireless communication, including WiFi and/or Bluetooth. As shown in FIG. 1B, sensor nodes 100 may be strategically placed on the anterior thorax as shown in torso partial view 120, allowing for the simultaneous recording of respiratory sounds from both lungs. The accelerometers and other sensors are incorporated into the wearable device to measure the patient's activity levels, posture, and other physiological parameters, providing additional context and insights into the patient's overall health and wellbeing.

Figure 1C:
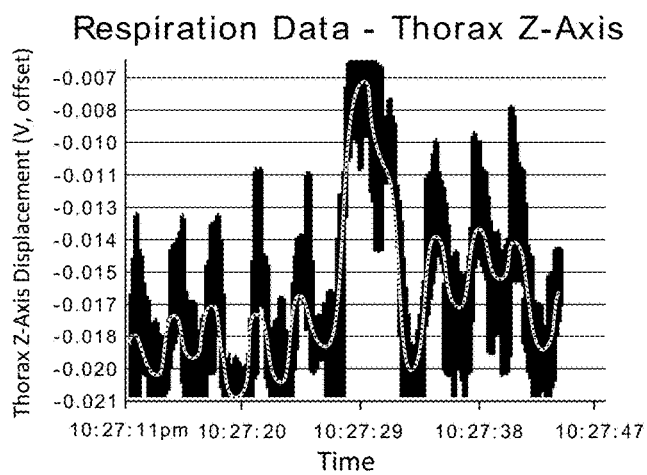
FIG. 1C illustrates charted respiration and thorax z-axis data that may be collected in accordance with an aspect of the invention.
Figure 1D:
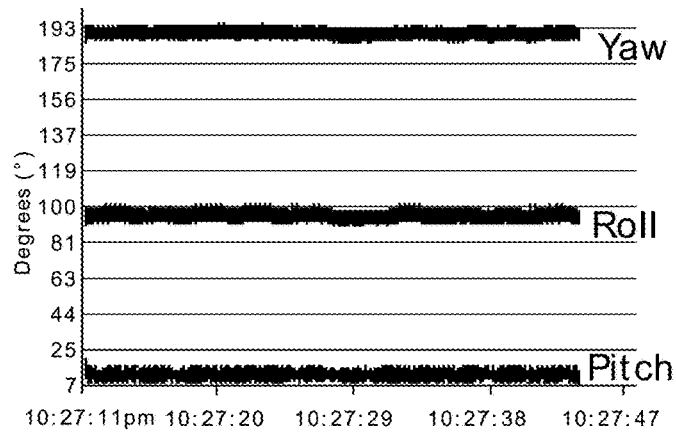
FIG. 1D illustrates charted positional data that may be computed and collected in accordance with an aspect of the invention.
Figure 1E:
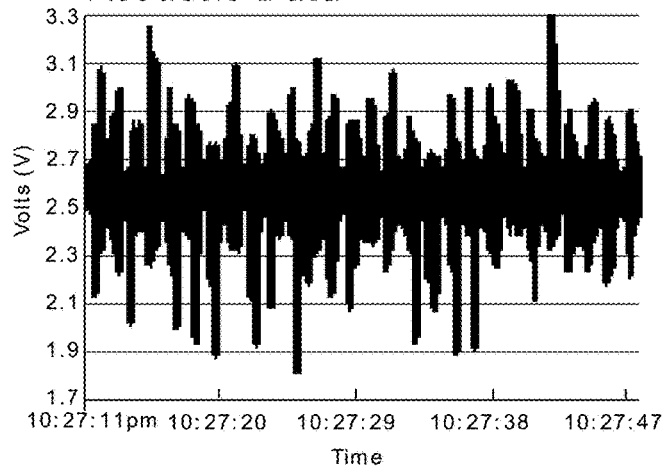
FIG. 1E illustrates charted acoustic data that may be collected in accordance with an aspect of the invention.
Figure 1F:
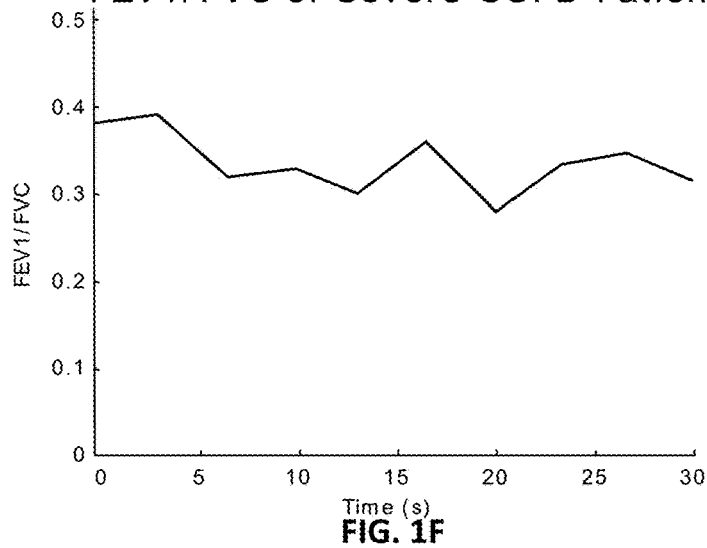
FIG. 1F illustrates charted FEV1/FVC ratios over time for a hypothetical patient with severe COPD.

FIGS. 1C, 1D, and 1E illustrate respiration data, positional data, and raw acoustic data, respectively, that may be collected by sensor node 100 or computed from data collected by sensor node 100. FIG. 1F illustrates FEV1/FVC ratios over time for a hypothetical patient with severe COPD.

Aspects of the present invention include signal processing and machine learning algorithms, which analyze the collected data to extract relevant passive acoustic features and predict forced expiratory volume in one second (FEV1) and forced vital capacity (FVC). These algorithms are trained using supervised learning techniques, with data from patients with varying degrees of COPD severity and also with data from a particular patient who will be using the system, ensuring accurate and reliable predictions across different patient populations. The extracted features, such as respiratory rate, inhalation duration, exhalation duration, mean airflow velocity, duration of pauses, spectral centroid, and spectral bandwidth, are used to formulate a linear regression model for predicting FEV1/FVC, FEV1, or FVC as a function of the features.

With respect to FIG. 2A, aspects of the system 200 may comprise two sensor nodes 100, disposed on a patient's anterior thorax 201 as nodes 100L and 100R, patient device 220 configured to operate patient portal 221, remote server 230, and provider device 240 configured to operate provider dashboard 241. Elements of the system are interconnected or interconnectable by network 210. Nodes 100L and 100R may connect to patient device via a data channel 205 separate from network 210. Data channel 205 may use a wireless protocol such as WiFi or Bluetooth. Sensor nodes 100 may be disposed on a patient with harness 110 or adjustable body straps and can be easily used under any clothing/apparel. Providers may have remote access to recorded patient data, trends, and analytics through a simple, yet informative, dashboard 241 having a user interface such as exemplary interface 245 in FIG. 2B. Server 230 and provider device 240 may communicate via means other than network 210, such as channel 235. This system includes a healthcare dashboard 241 that offers segmented views for quick access to patient information, insights into health trends, a summary of physiological data with visual aids for easy interpretation (FIG. 2C), and detailed analyses of physiological features such as the I:E ratio (FIG. 2E), heart rate (FIG. 2F), lung capacity, and movement tracking (FIG. 2G).

Aspects of the invention incorporate advanced data fusion techniques, which combine information from multiple sensors and modalities to enhance the accuracy and reliability of the predictions. This data fusion approach allows the system to detect subtle changes in breathing patterns, which may indicate exacerbations or other complications in patients with COPD. For example, embodiments of the system can detect changes in the timing or intensity of breathing sounds, which may indicate narrowing of the airways or other respiratory problems. The integration of data from accelerometers and other sensors provides further context on the patient's activity levels and posture, offering a more comprehensive understanding of their respiratory health. This integration also enables the system to offer real-time tracking of patient posture in three dimensions (FIG. 2I), continuous monitoring of posture adjustments (FIG. 2J), and tracking user kinematics and posture with visual indicators for movement and posture, accompanied by analytical data of body orientation changes (FIG. 2H).

Figure 2B:
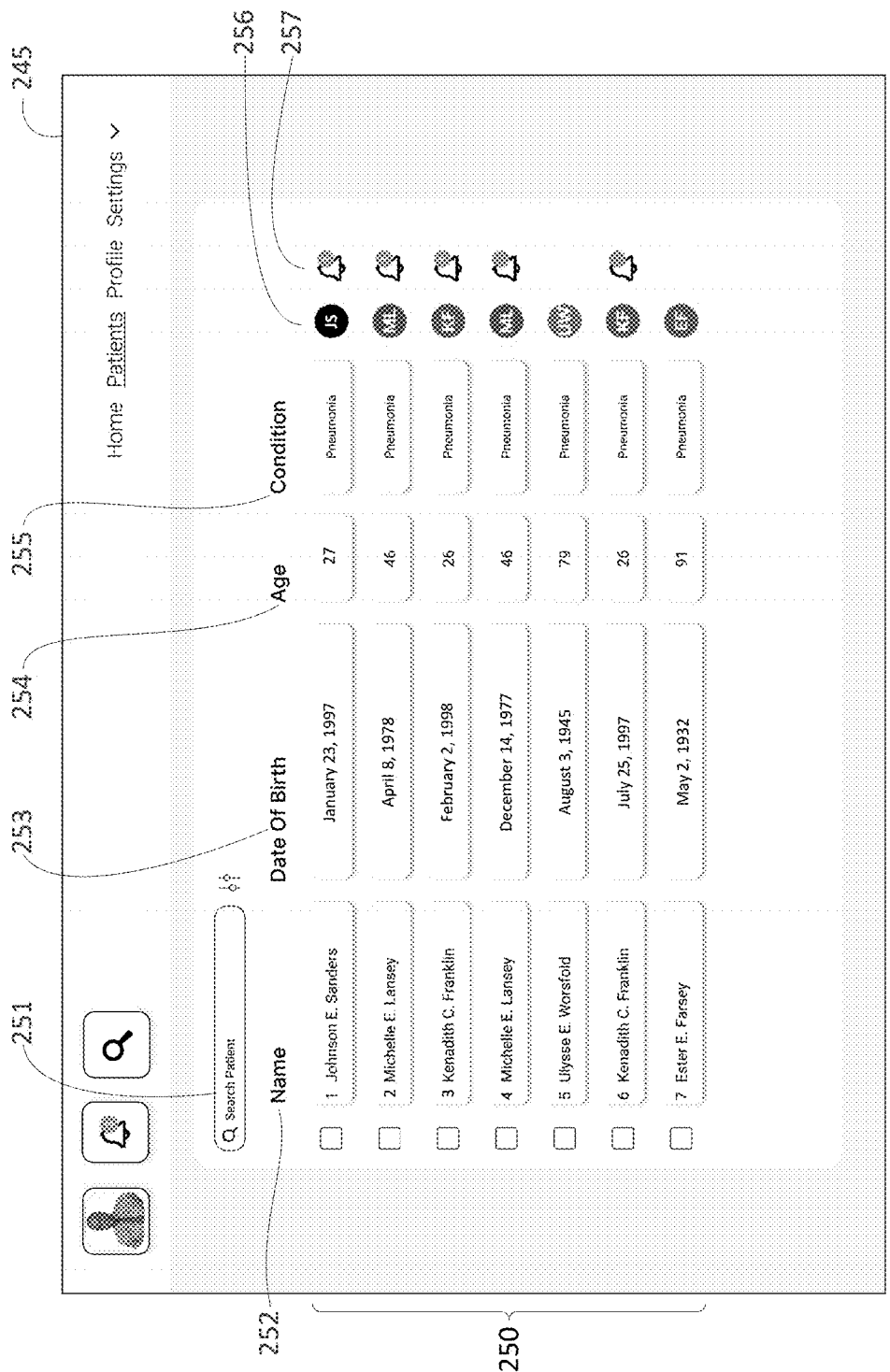
FIGS. 2B-2J illustrate exemplary pages of a provider dashboard interface with exemplary patients' information.

In embodiments of the invention, there is provided a patient list interface 245, an example populated with hypothetical data illustrated in FIG. 2B. Interface 245 presents a list of patients 250. The interface includes a patient search function 251, sortable columns for name 252, date of birth 253, age 254, condition 255, visual ID 256 (which can comprise a patient specific color coding and initials) along with icons indicating various actions such as alerts 257 specific to each patient, in accordance with embodiments of the invention.

Figure 2C:
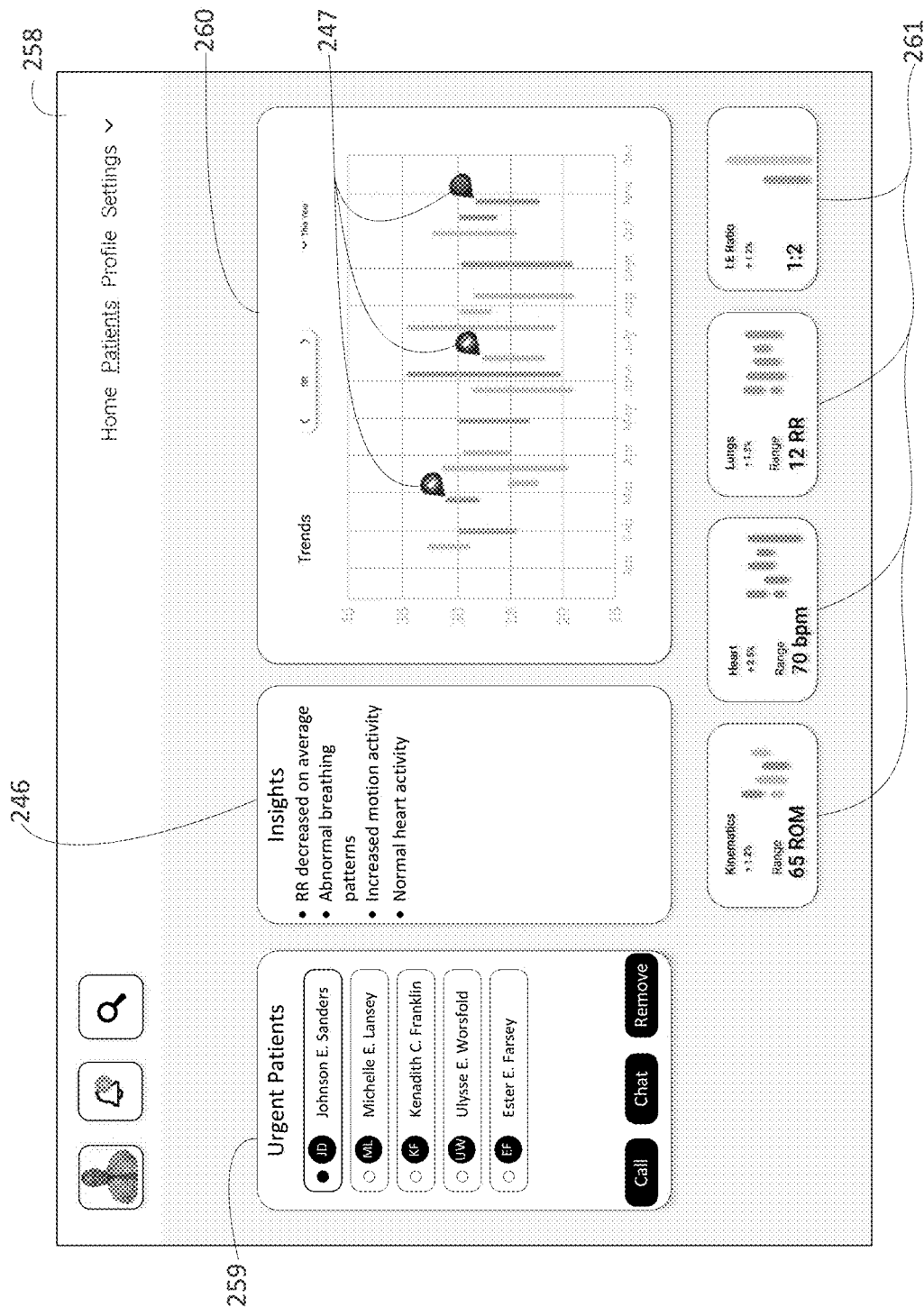

In embodiments of the invention, there may be provided a patient home page 258 within the healthcare dashboard, an example populated with hypothetical data for illustrative purposes as illustrated in FIG. 2C. Home page 258 may offer a segmented view for quick access to patient information, including urgent alerts 259, insights 246 into health trends 260, and summaries 261 of physiological data with visual aids for easy interpretation, such as for range of motion, heart rate, respiration rate, and I:E ratio.

In some embodiments, home page 258 may include markers 247 correlating to specific events such as a patient zoom session with a provider, a scheduled phone call, or an exacerbation event. These may be input by the medical provider or automatically generated based on sensor data.

Figure 2D:
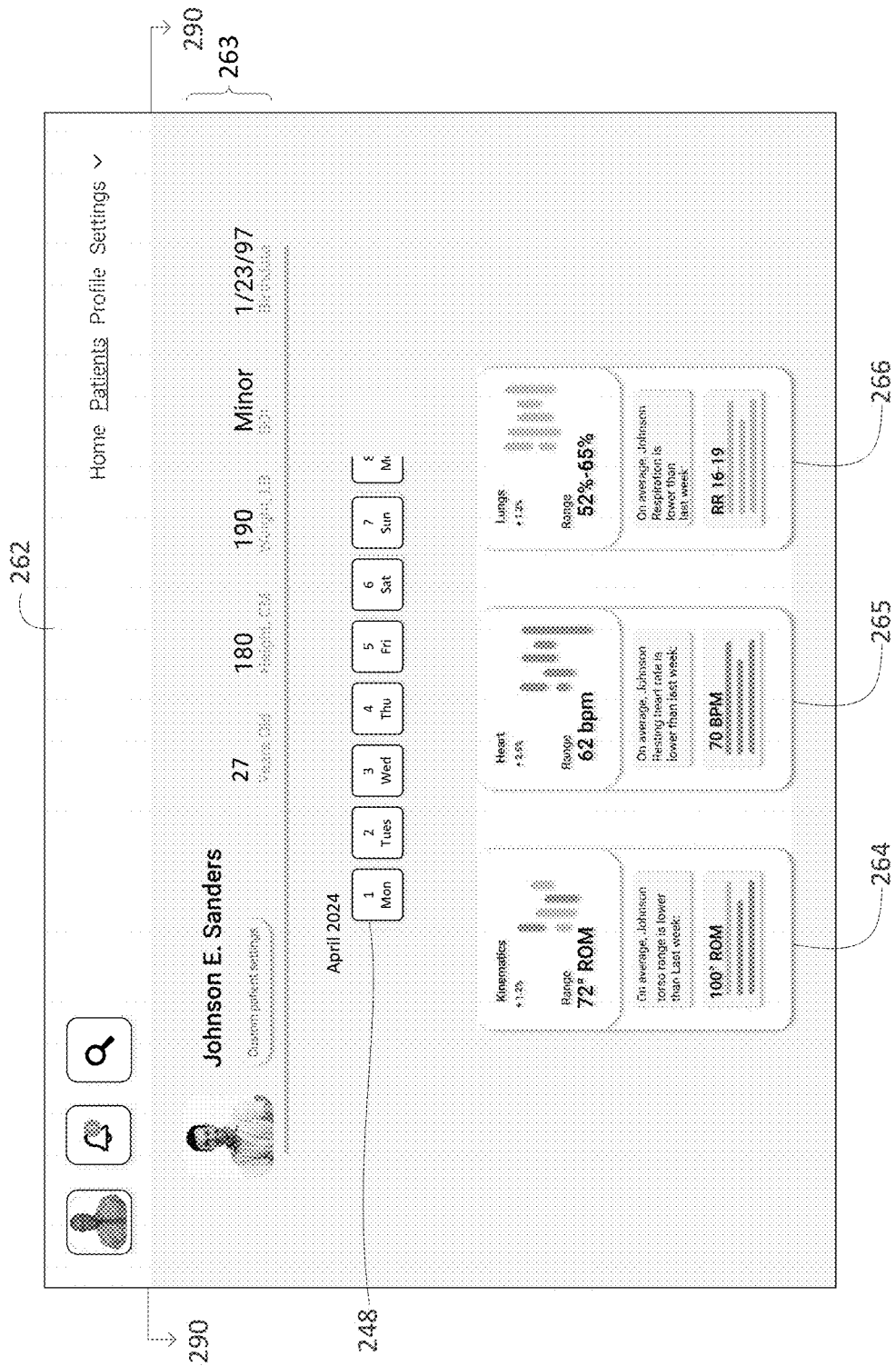

With reference to FIG. 2D, an example populated with hypothetical data for illustrative purposes, there may be a high-level patient data overview page 262, summarizing key biographic information 263 for a user-selectable date 248 and displaying kinematic data and graphic snapshot 264, heart data snapshot 265, and lung data snapshot 266 for day-to-day tracking.

Figure 2E:
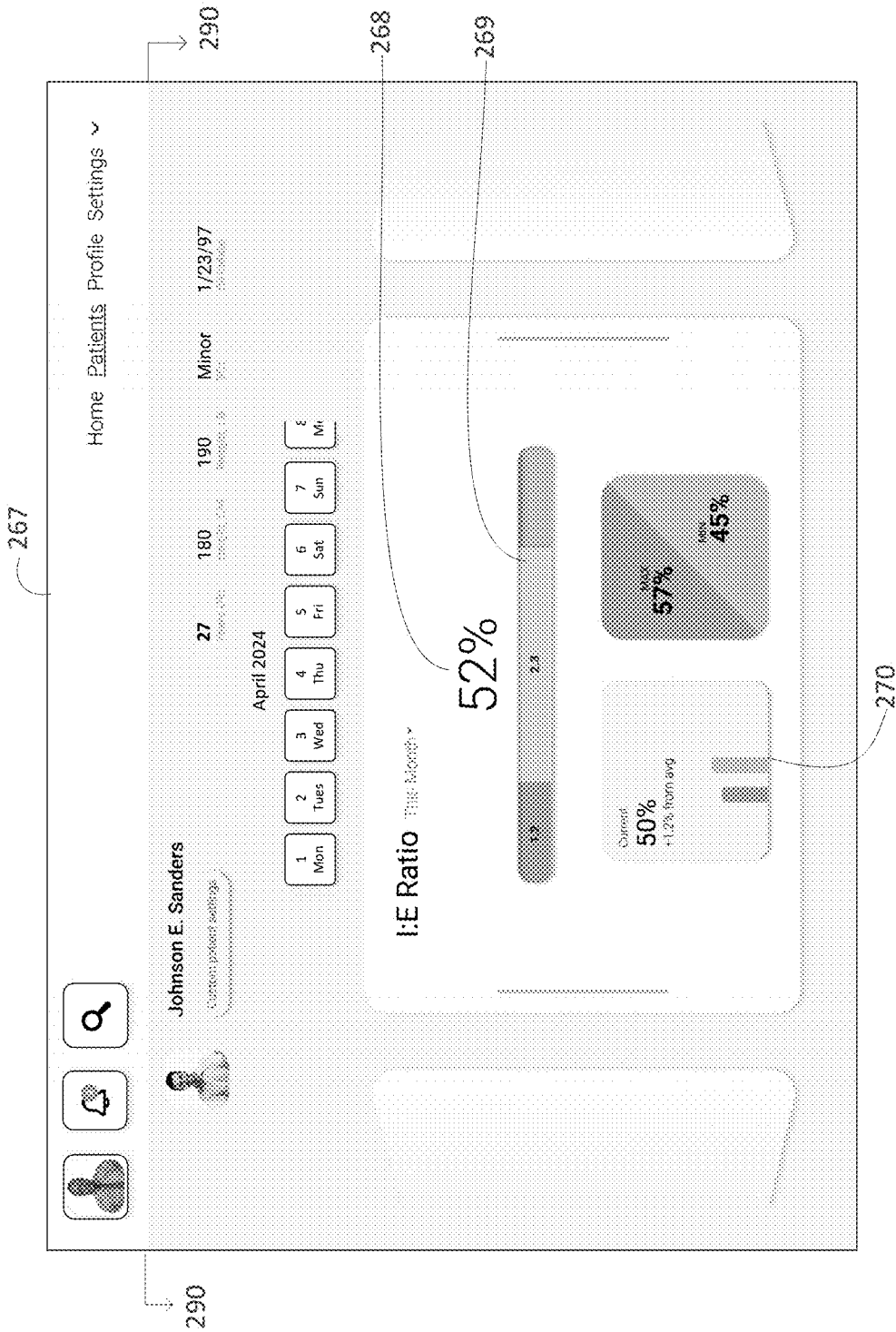

With reference to FIG. 2E, an example populated with hypothetical data for illustrative purposes, there may be a detailed patient physiological features page focusing on the I:E ratio (Inhalation to Exhalation) 267. The page may include a current percentage 268, visual trend over time 269, and a comparison to historical average values 270 and minimum and maximum.

Figure 2F:
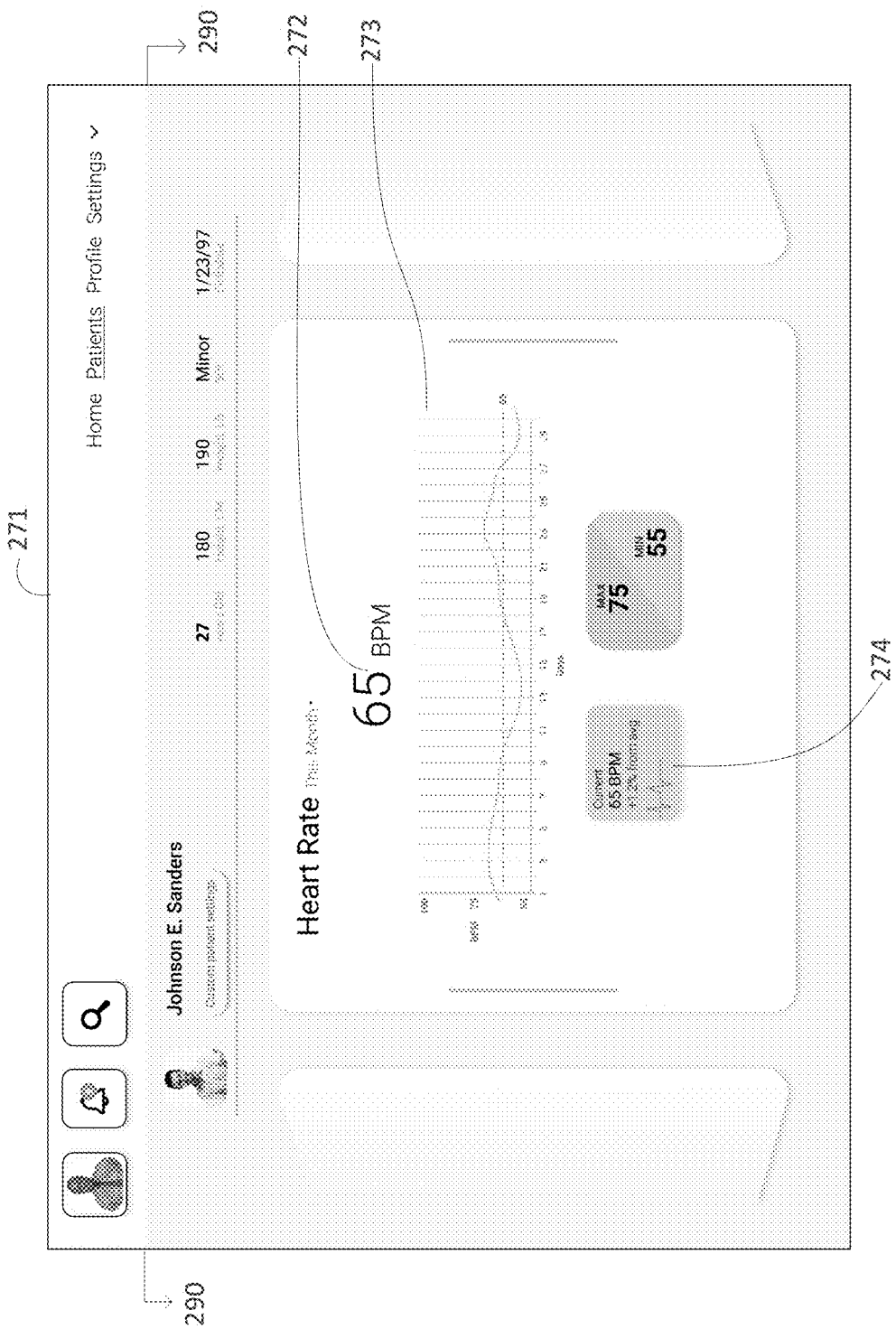
Figure 2G:
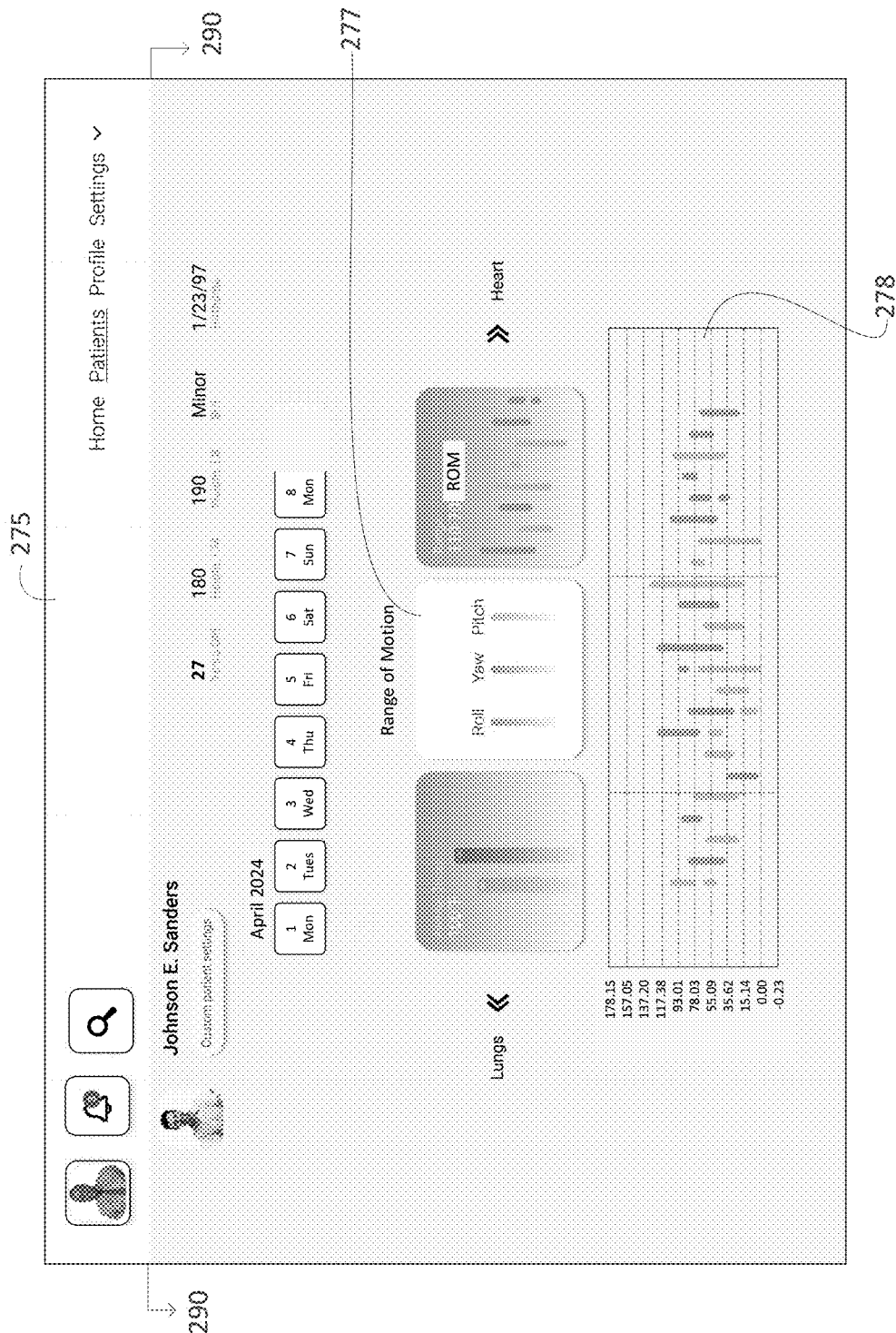
Figure 2H:
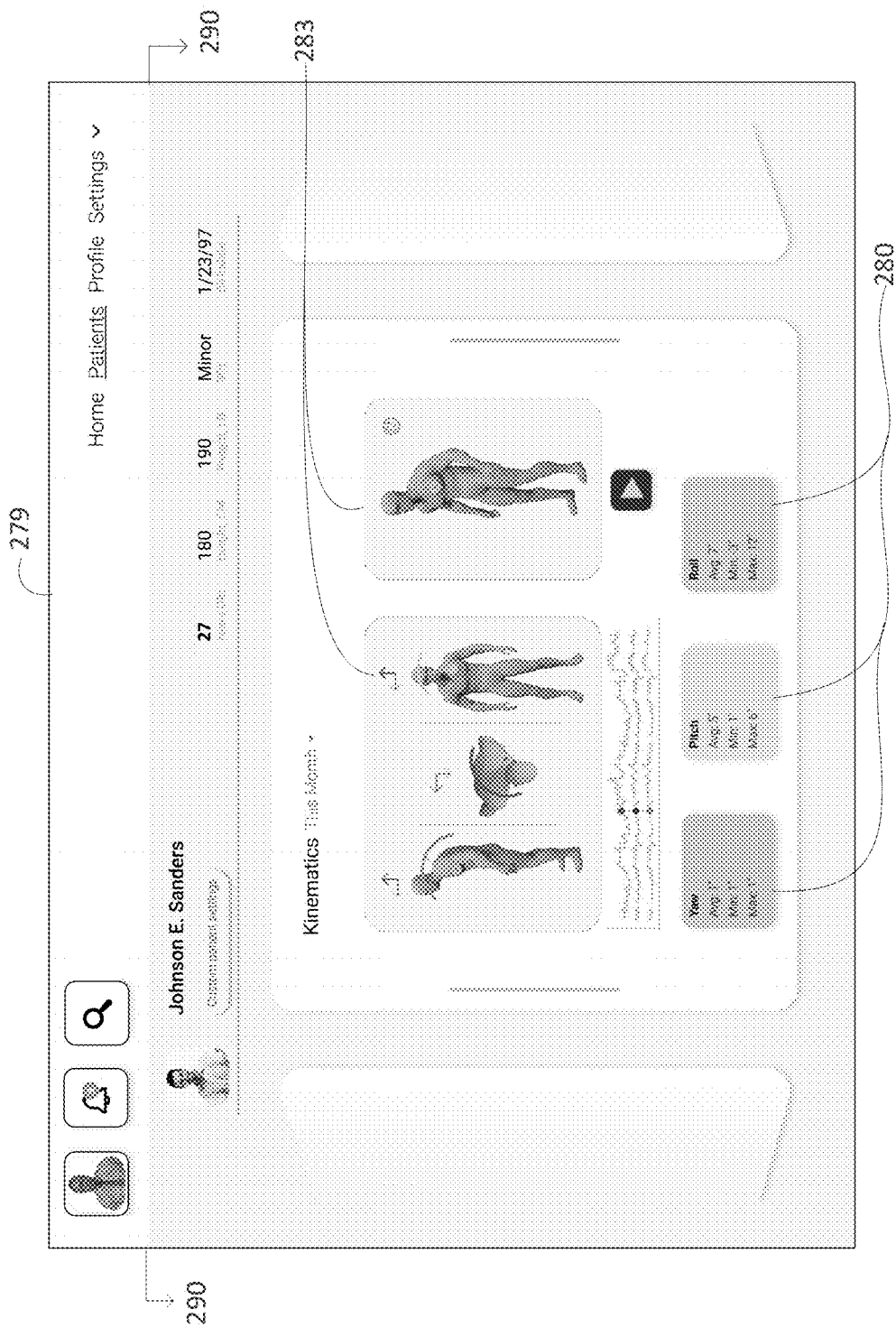

With reference to FIG. 2F, an example populated with hypothetical data for illustrative purposes, there may be a patient heart rate page 271, showing current beats per minute 272, a graphical trend over the month 273, comparative data highlighting deviations from average rates 274, and minimum and maximum.

With reference to FIG. 2G, an example populated with hypothetical data for illustrative purposes, there may be a patient-centric detailed view page 275, showcasing focused physiological data points such as movement tracking through roll, yaw, and pitch metrics 277 with corresponding graphical trends 278.

With reference to FIG. 2H, an example populated with hypothetical data for illustrative purposes, there may be a patient kinematic and posture page 279, providing an animatable visual representation 283 of a 3D model of the patient with visual indicators for movement and posture, accompanied by analytical data of body orientation changes 280.

Figure 2I:
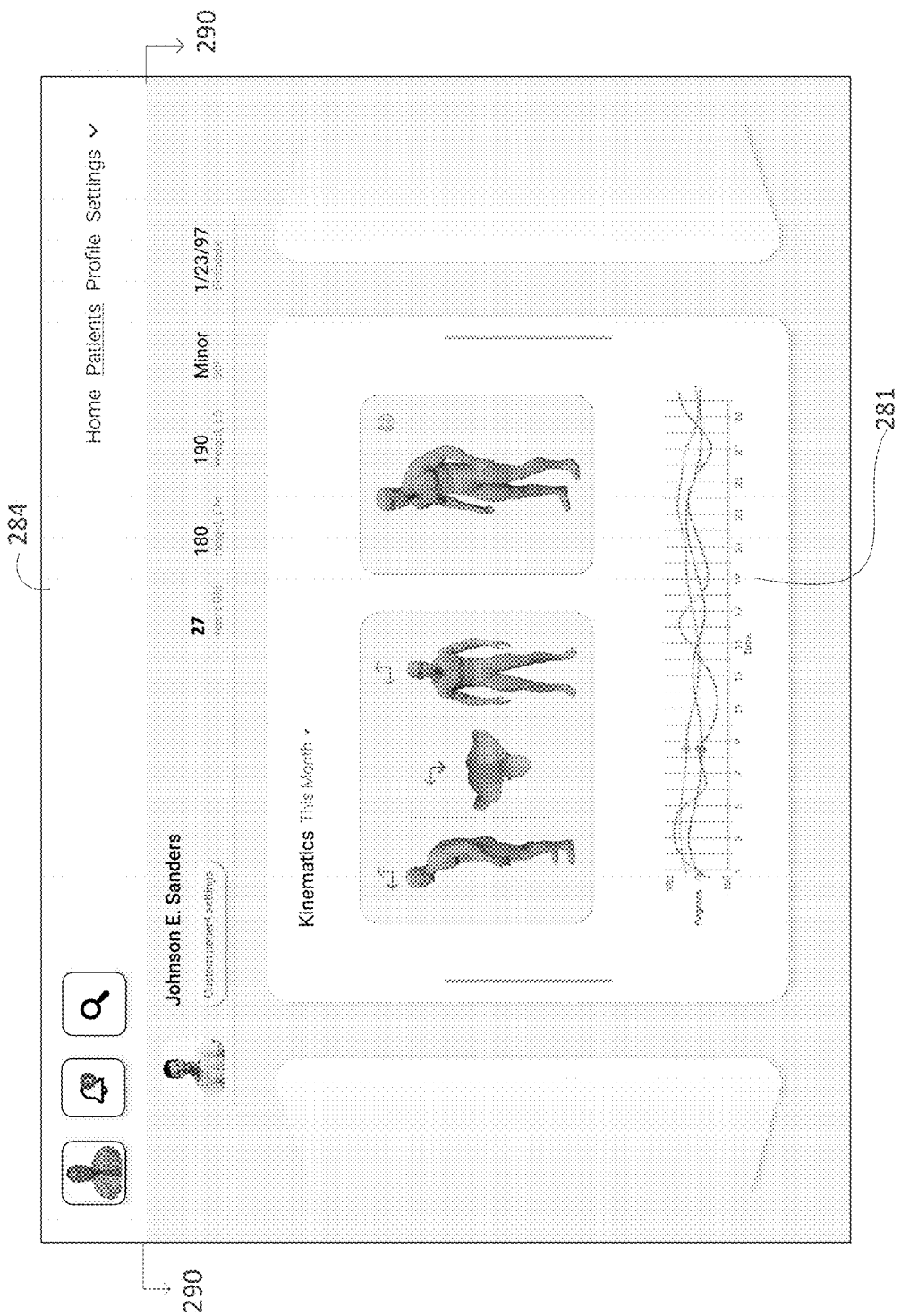

With reference to FIG. 2I, an example populated with hypothetical data for illustrative purposes, there may be a continuous patient posture monitoring page 284, depicting a 3D model of the patient's posture. Patient posture monitoring page 284 may provide ongoing tracking with a real-time graphical display of kinematic posture data over a specified time frame 281.

Figure 2J:
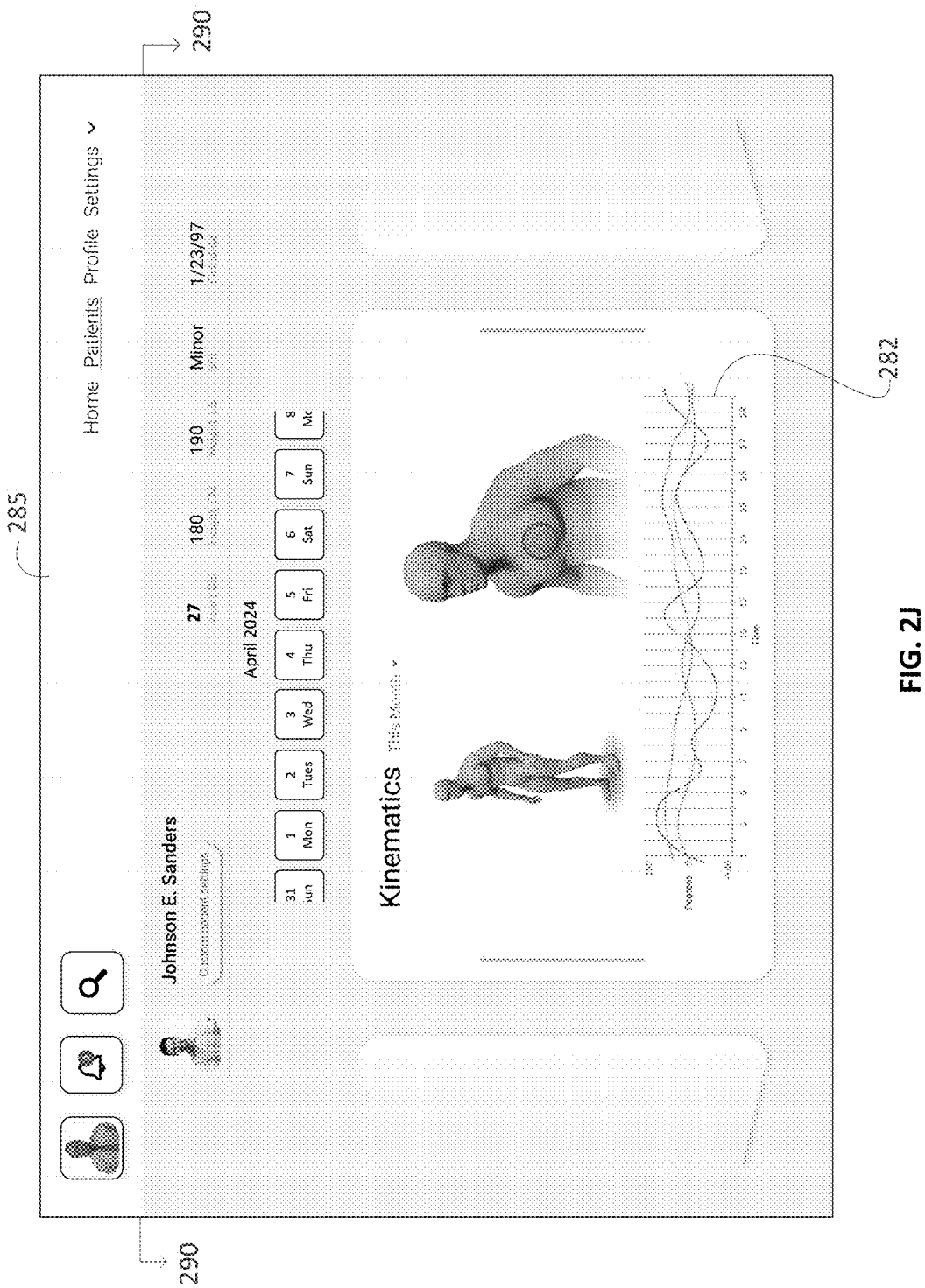

With reference to FIG. 2J, an example populated with hypothetical data for illustrative purposes, there may be a continuous kinematic analysis of patient posture page 285. Page 285 may offer a closer inspection of the patient's posture adjustments with corresponding graphical data trends 282.

In some embodiments of the invention, the patient is provided with a patient portal app 221 for running on, for example, patient mobile device 220. The app may provide the patient with screen and page presentations consistent with FIGS. 2D-2J as depicted below boundary 290.

In some embodiments of the system robust encryption techniques for data transmission and storage are employed. In some embodiments, seamless integration with electronic health record (EHR) systems is provided, enabling healthcare providers to access and analyze patient data in real-time, facilitating early intervention and personalized treatment plans.

Aspects of the present invention can promote patient engagement and self-management. Embodiments of the system provide real-time feedback and visualization of lung function metrics and can empower patients to better understand their condition and take an active role in their healthcare. The wearable nature of the device allows for continuous monitoring in various nonclinical settings, including the patient's home, workplace, or during physical activity, providing valuable insights into the impact of different environments and activities on their respiratory health.

Bilateral FEV1/FVC

Embodiments of the present invention utilize bilateral acoustic sensing technology, which allows for the simultaneous monitoring of both lungs. This approach can enable patients and caregivers to record and analyze breathing sounds from the left and right sides of the chest, offering a more comprehensive view of the patient's breathing patterns, thus enhancing the accuracy and reliability of the lung function predictions.

Figure 3A:
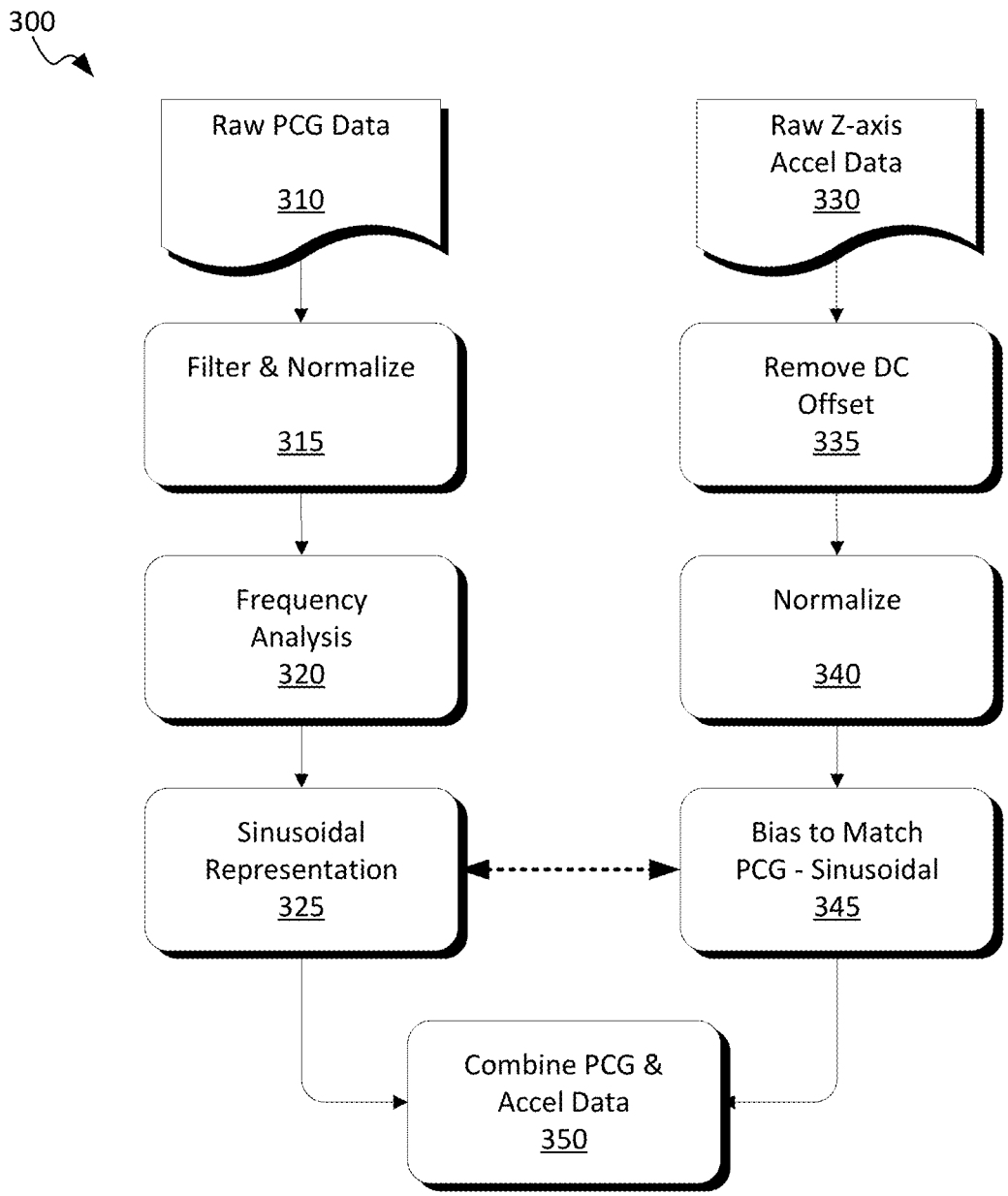
FIG. 3A illustrates a process for PPLG processing and output in accordance with embodiments of the invention.

Aspects of the invention may use process 300 and a mathematical model in support of the bilateral sensing approach. The model can be described as follows:

Let x(t) be the sound waveform recorded at time t from the left lung and y(t) be the sound waveform recorded at time t from the right lung. With reference to FIG. 3A, these waveforms constitute Raw PCG Data 310. Let h(t) be the impulse response of the acoustic transfer function from the anterior thorax to the microphones. Then, the recorded signals can be modeled as:

$$x'(t) = h(t) * x(t) + n_1(t) y'(t) = h(t) * y(t) + n_2(t)$$

where x'(t) and y'(t) are the recorded signals after passing through the acoustic transfer function, "*" is the convolution operator, and $n_1(t)$ and $n_2(t)$ are the additive noise components. Additional transformation is then performed, such as the combination 350 of bilateral acoustic phonocardiogram (PCG) and accelerometer z-axis (AZ) data 330, to generate a detailed representation of the respiratory cycle, referred to as the phonopulmogram (PPLG).

The PCG data undergoes bandpass filtering 315 and frequency analysis 320 before being represented sinusoidally 325. Concurrently, the accelerometer data is processed by removing its DC component 335 and normalizing the signal 340. The processed signals from both sources are then averaged 345, yielding the final PPLG. This synergistic use of PCG and AZ data can allow for a more precise estimation of the respiratory cycle, providing a failsafe source of information in case one signal becomes unreliable. This robust approach also facilitates the calculation of clinically significant parameters such as the Inspiratory:Expiratory (I:E) ratio. This ratio is a vital metric in assessing the respiratory status of patients, providing insights into conditions like respiratory fatigue or impending respiratory failure. FIG. 3D presents a phonopulmogram output sample, underscoring the advantages of merging PCG and AZ data. The ability to accurately determine the I:E ratio from the PPLG adds another layer of clinical utility. This ratio is a vital metric in assessing the respiratory status of patients, providing insights into conditions like respiratory fatigue or impending respiratory failure. This data fusion allows for a robust and precise estimation of the respiratory rate and other critical parameters, such as the I:E ratio.

The recorded signals may then be analyzed to extract relevant passive acoustic features that can be used to predict FEV1 or FVC without requiring the subject to perform any forced expiratory maneuvers. The features to be extracted may include:

1. Respiratory Rate (RR): The number of breaths the subject takes in a minute.
2. Inhalation Duration (ID): The time it takes for the subject to inhale air during a single breath.
3. Exhalation Duration (ED): The time it takes for the subject to exhale air during a single breath.
4. Mean Airflow Velocity (AFV): The average speed at which air flows through the airways during a breathing cycle.
5. Duration of Pauses (DP): The time intervals between inhalation and exhalation during a breathing cycle.
6. Spectral centroid (SC): The center frequency of the power spectrum of the recorded signal.
7. Spectral bandwidth (SB): The width of the power spectrum of the recorded signal.

A linear regression model can then be formulated to predict FEV1/FVC as a function of the features extracted by using:

$$FEV1/FVC = \\ b_0 + b_1 \cdot RR + b_2 \cdot ID + b_3 \cdot ED + b_4 \cdot AFV + b_5 \cdot DP + b_6 \cdot SC + b_7 \cdot SB \quad (1)$$

where $b_0$, $b_1$, $b_2$, $b_3$, $b_4$, $b_5$, $b_6$, and $b_7$ are the coefficients for the intercept and each feature, respectively. The least squares method can then be used to estimate the values of these coefficients that minimize the sum of the squared errors between the predicted and the actual values of FEV1/FVC. The training process involves gathering actual FEV1/FVC ratios during spirometry sessions at specific intervals to create a "target" FEV1/FVC time series matching the estimated series.

Figure 3B:
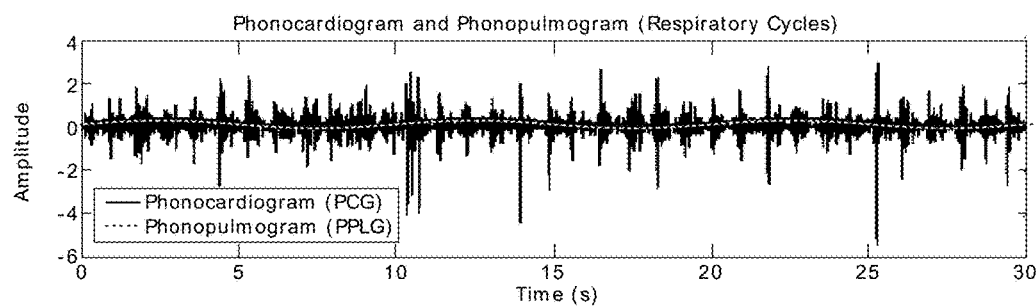
FIG. 3B illustrates exemplary phonocardiogram and phonopulmogram data in accordance with embodiments of the invention.
Figure 3C:
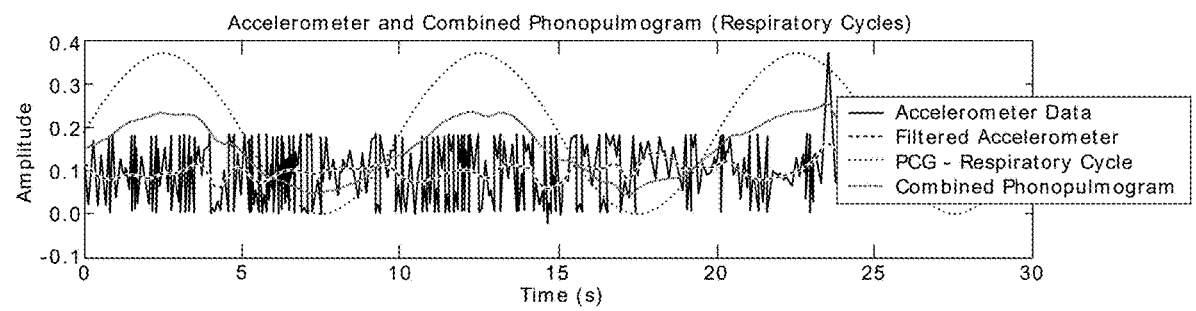
FIG. 3C illustrates exemplary accelerometer and combined phonopulmogram data in accordance with embodiments of the invention.
Figure 3D:
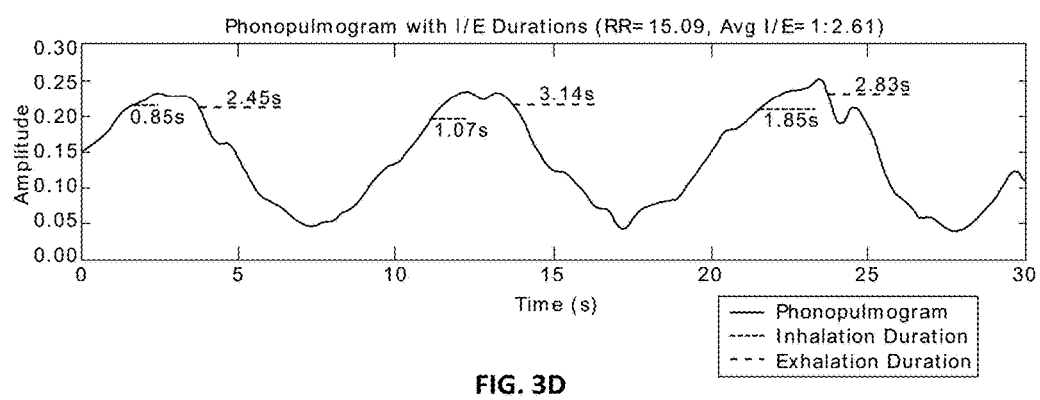
FIG. 3D illustrates exemplary phonopulmogram with I/E durations data in accordance with embodiments of the invention.
Figure 4A:
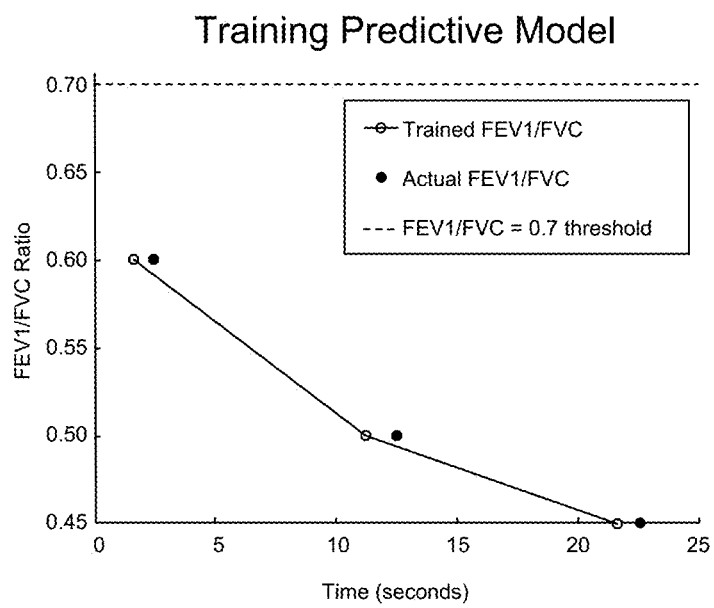
FIG. 4A illustrates exemplary model training data in accordance with embodiments of the invention.
Figure 4B:
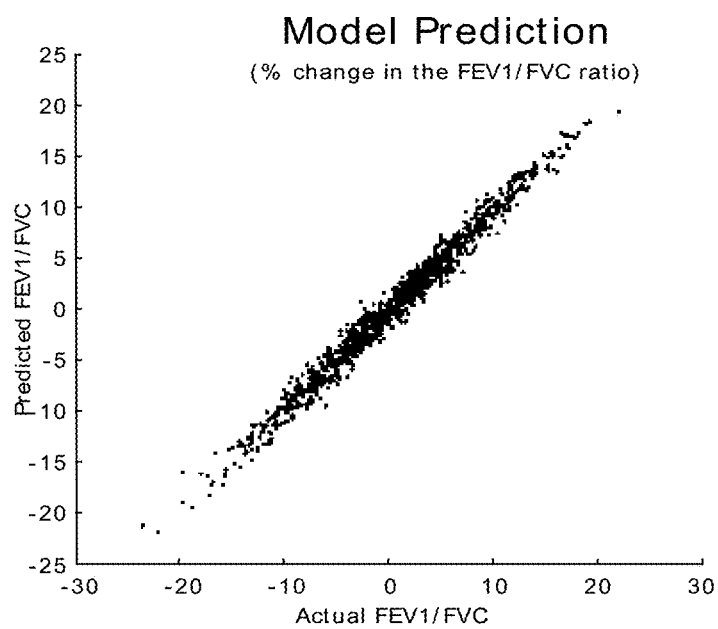
FIG. 4B illustrates an exemplary sample plot of actual and estimated in accordance with embodiments of the invention.

FIGS. 3B, 3C, and 3D illustrate exemplary PPLG output and demonstrate merging PCG with AZ data. FIG. 4A illustrates an exemplary comparison of a new set of estimated FEV1/FVC values to actual values, based on the exemplary data from FIGS. 3B, 3C, and 3D. FIG. 4B illustrates exemplary estimates of FEV1/FVC from synthetic sensor recordings during free running. To predict either FEV1 or FVC instead of FEV1/FVC, the weights ($b_0$ to $b_7$) are retrained for each prediction accordingly. While linear regression is used in the preliminary analysis due to its ease of interpretability, aspects of the present invention may be extended to utilize non-linear prediction and advanced ML techniques when appropriate, considering the balance between computational complexity and accuracy for implementation on a particular device such as patient mobile device 220.

In accordance with aspects of the invention, the bilateral acoustic sensing innovation is useful in patients with COPD, as it allows for the detection of subtle changes in breathing patterns that can indicate exacerbations or other complications. By incorporating the phonopulmogram (PPLG), the system may further enhance the capability to detect changes in timing or intensity of breathing sounds, which may indicate narrowing of the airways or other respiratory problems. In some embodiments, other modalities may also be incorporated, such as accelerometers, to provide additional data on the patient's activity levels and posture. Embodiments of the system may use ML algorithms to analyze the data from these different modalities and provide insights into the patient's overall health and wellbeing. Aspects of the invention may be used to detect changes in breathing patterns that may not be apparent from other methods, such as visual observation or pulse oximetry. Such information enables early intervention to prevent exacerbations or other complications, leading to better outcomes for patients with COPD. Overall, the bilateral acoustic sensing innovation is valuable for breathing analysis and has the potential to significantly improve the management of COPD in remote settings.

Machine Learning (ML) for Patient Assessment Personalization with Activities of Daily Living (MPAS-ADL):

Some embodiments of the invention may provide valuable insights into a patient's functional status, taking into account their unique characteristics and circumstances. Reinforcement learning is applied to identify certain features from the sensor data to monitor a patient's daily activities and provide insights into their functional status. An algorithm in accordance with such embodiments may provide personalized assessments for each patient. The algorithm is described as follows: (I) Let S be the state space, A be the action space, and R be the reward function. The algorithm is initialized with a set of features that are known to be important for monitoring COPD patients, such as respiratory rate, coughing frequency, and activity level; S={s1, s2, ..., sn}. (II) Data are collected from sensor nodes for a group of COPD patients performing different activities of daily living, such as sitting, walking, stair climbing, and breathing exercises. D={d1, d2, ..., dm}. (III) The collected data are used to train a reinforcement learning agent that can identify which features are most relevant for monitoring a patient's activities of daily living to maximize the expected total reward, $R=\Sigma_t \gamma^t r_t$, where $r_t$ is the reward at time step t and $\gamma$ is the discount factor. (IV) During training, the agent is rewarded for accurately predicting the patient's activity based on the multimodal data collected from the sensor nodes by using the Q-learning algorithm: Q(s, a)←Q(s, a)+α(r+γ max a' Q(s', a')−Q(s, a)), where π(a|s) is the agent's policy. (V) Once the agent has been trained, it is used to identify the most relevant features for monitoring a patient's activities of daily living, A={$a_1$, $a_2$, ..., $a_k$}. (VI) The identified features are used to develop personalized models for each patient, M={$m_1$, $m_2$, ..., $m_n$}, where $m_i$ is a function of the patient's features and their specific ADL. (VII) Data are continuously collected from the sensor nodes and update the personalized models for each patient using learning algorithms running on the server. (VIII) Pulmonologists are provided with insights into a patient's functional status based on the personalized models, Q(s, a)=E[R|s, a]. The pulmonary provider can then use the insights provided by aspects of the inventive system and method to adjust treatment plans and improve the quality of life for COPD patients.

Functional status may encompass established protocols such as the Six-Minute Walk Test (6MWT)[36], Timed Up and Go (TUG) [37] Test, and Short Physical Performance Battery (SPPB) [38] test.

It is appreciated that certain aspects of the above-described embodiments can be implemented by hardware, or software, or a combination of hardware and software. If implemented by software, it can be stored in tangible computer-readable media. The software, when executed by the processor can perform disclosed method steps.

Consistent with the present disclosure, a processor in a patient device 220, a sensor node processor 106, and a processor within a server 230 may be configured with machine learning algorithms in order to implement any of the systems and methods disclosed herein. In some embodiments, machine learning algorithms (also referred to as machine learning models) may be trained using training data. Some non-limiting examples of such machine learning algorithms may include classification algorithms, and data regressions algorithms. In embodiments, a trained machine learning algorithm may include an inference model, such as a predictive model, a classification model, and a regression model.

REFERENCES

[1] GBD Chronic Respiratory Disease Collaborators. "Prevalence and attributable health burden of chronic respiratory diseases, 1990-2017: a systematic analysis for the Global Burden of Disease Study 2017." The Lancet. Respiratory medicine vol. 8, 6 (2020): 585-596. doi: 10.1016/S2213-2600(20)30105-3.

[2] Løkke, Anders et al. "Economic Burden of COPD by Disease Severity-A Nationwide Cohort Study in Denmark." International journal of chronic obstructive pulmonary disease vol. 16 603-613. 10 Mar. 2021, doi: 10.2147/COPD.S295388.

[3] Ford, E. S., et al. (2018). "Disparities in COPD Among US Adults: A Multistate Surveillance System Study." Chest, 153 (5), 1218-1225.

[4] Nguyen, H. Q., et al. (2018). "COPD in US Women: A Public Health Descriptive Study." International Journal of Chronic Obstructive Pulmonary Disease, 13, 965-972.

[5] Nordgren, Tara M, and Kristina L Bailey. "Pulmonary health effects of agriculture." Current opinion in pulmonary medicine vol. 22, 2 (2016): 144-9. doi:10.1097/MCP.0000000000000247.

[6] Bhatt, S. P., et al. (2015). "Socioeconomic status and COPD among low- and middle-income countries." International Journal of COPD, 10, 111-123. doi: 10.2147/COPD.S40058.

[7] Mukherjee, S., et al. (2021). "Burden and risk factors of chronic obstructive pulmonary disease in rural India: Insights from the baseline survey of a prospective cohort study." International Journal of COPD, 16, 775-786. doi:10.2147/COPD.S290714.

[8] de Miguel-Diez, J., et al. (2020). "Prevalence of Chronic Obstructive Pulmonary Disease and Associated Factors in Spain: A Population-Based Study." International Journal of Environmental Research and Public Health, 17 (19), 7253.

[9] Ford, E. S., et al. (2018). "Disparities in COPD Among US Adults: A Multistate Surveillance System Study." Chest, 153 (5), 1218-1225.

[10] Ferguson G T, Beck B, Clerisme-Beaty E, et al. Recruiting patients after hospital discharge for acute exacerbation of COPD: Challenges and lessons learned. Chronic Obstr Pulm Dis. 2017; 4 (4): 265-278. doi: 10.15326/jcopdf.4.4.2016.0176.

[11] Qureshi, Hammad et al. "Chronic obstructive pulmonary disease exacerbations: latest evidence and clinical implications." Therapeutic advances in chronic disease vol. 5, 5 (2014): 212-27. doi:10.1177/2040622314532862.

[12] Portillo, Edward C et al. "Reducing COPD Readmission Rates: Using a COPD Care Service During Care Transitions." Federal practitioner: for the health care professionals of the VA, DoD, and PHS vol. 35, 11 (2018): 30-36.

[13] Rabbani, Golam et al. "Pre-existing COPD is associated with an increased risk of mortality and severity in COVID-19: a rapid systematic review and meta-analysis." Expert review of respiratory medicine vol. 15, 5 (2021): 705-716. doi:10.1080/17476348.2021.1866547.

[14] Kong, Chia Wei, and Tom M A Wilkinson. "Predicting and preventing hospital readmission for exacerbations of COPD." ERJ open research vol. 6, 2 00325-2019. 11 May 2020, doi:10.1183/23120541.00325-2019.

[15] Hernandez-Sanchez, J., Singh, A., Villegas-Montoya, C., & Kesavabhotla, K. (2020). Wearable devices for remote monitoring of COPD. International Journal of Chronic Obstructive Pulmonary Disease, 15, 2383-2395. doi.org/10.2147/COPD.S276209.

[16] Martinez, C. H., Mannino, D. M., Jaimes, F. A., Curtis, J. L., Han, M. K., Hansel, N. N., Regan, E. A., Rennard, S. I., Woodruff, P. G., & Criner, G. J. (2021). A novel patient-centered remote study for COPD (COPD360Net): Rationale, design and methodology. Annals of the American Thoracic Society, 18 (1), 21-30. doi.org/10.1513/AnnalsATS.202003-232SD.

[17] Van Haren, R. M., Moller, T., Yancy, C. W., & Durheim, M. T. (2021). Remote monitoring in heart failure and COPD: What are the patient and provider expectations? Heart Failure Reviews, 26 (1), 1-8. doi.org/10.1007/s10741-020-10036-2.

[18] The Cost of COPD, web page available at www.everydayhealth.com/news/the-cost-of-copd-and-the-affordable-care-act/.

[19] L. Emokpae, A Body Area Sensor Network Biofeedback System, U.S. patent application Ser. No. 16/861, 824, Notice of Award, August 2022.

[20] Lloyd E. Emokpae, Roland N. Emokpae Jr., Ese Bowry, Jaeed Bin Saif, Muntasir Mahmud, Wassila Lalouani, Mohamed Younis, and Robert L. Joyner Jr., "A wearable multi-modal acoustic system for breathing analysis", The Journal of the Acoustical Society of America 151, 1033-1038 (2022) doi.org/10.1121/10.0009487.

[21] W. Lalouani, M. Younis, R. N. Emokpae, Jr., and L. Emokpae, "Enabling Effective Breathing Sound Analysis for Automated Diagnosis of Lung Diseases," Elsevier Smart Health, vol. 26, 2022:100329. doi:10.1016/j.smhl.2022.100329.

[22] F. Ejzykowicz and K. Rajagopalan, "Health Care Use and Costs Among Medicare Patients With Chronic Obstructive Pulmonary Disease Treated With Short-Acting Beta Agonists or Long-Acting Beta Agonists," Journal of Clinical Pathways, 2016; 2(3):31-38.

[23] Market Research Future. (2018). Chronic Obstructive Pulmonary Disease (COPD) and Asthma Devices Market Research Report-Global Forecast to 2023. Web page at www.marketresearchfuture.com/reports/copd-asthma-devices-market-4990.

[24] "Telehealth Market: Trends & Global Forecast to 2025." Markets and Markets (March 2020).

[25] Grand View Research. (2018). Remote Patient Monitoring Devices Market Analysis Report By Product (Vital Signs Monitors, Specialized Monitors), By Application (Cancer Treatment, Cardiovascular Diseases), And Segment Forecasts, 2018-2025. Web page available at www.grandviewresearch.com/industry-analysis/remote-patient-monitoring-devices-market.

[26] Kocks, Janwillem et al. "Putting health status guided COPD management to the test: protocol of the MARCH study." BMC pulmonary medicine vol. 13 41. 4 Jul. 2013, doi:10.1186/1471-2466-13-41.

[27] Sekhon, M., Cartwright, M. & Francis, J. J. Acceptability of healthcare interventions: an overview of reviews and development of a theoretical framework. BMC Health Serv Res 17, 88 (2017). https://doi.org/10.1186/s12913-017-2031-8

[28] Global Initiative for Chronic Obstructive Lung Disease. (2021). Global strategy for the diagnosis, management, and prevention of chronic obstructive pulmonary disease: 2021 report. Web page available at goldcopd.org/wp-content/uploads/2020/11/GOLD-REPORT-2021-v1.1-25Nov20_WMV.pdf.

[29] Celli, B. R., Cote, C. G., Marin, J. M., Casanova, C., Montes de Oca, M., Mendez, R. A., Pinto Plata, V., Cabral, H. J., & The COPD. (2004). Severity of airflow limitation as a predictor of COPD-related mortality. Chest, 126 (4), 1099-1106. doi.org/10.1378/chest.126.4.1099.

[30] L. E. Emokpae, R. N. Emokpae, W. Lalouani and M. Younis, "Smart Multimodal Telehealth-IoT System for COVID-19 Patients," in IEEE Pervasive Computing, vol. 20, no. 2, pp. 73-80, 1 Apr.-Jun. 2021, doi:10.1109/MPRV.2021.3068183.

[31] W. Lalouani, M. Younis, I. White-Gittens, R. N. Emokpae, L. E. Emokpae, "Energy-efficient collection of wearable sensor data through predictive sampling," Smart Health, Volume 21, 2021, 100208, ISSN 2352-6483, doi.org/10.1016/j.smhl.2021.100208.

[32] M. Younis, W. Lalouani, N. Lasla, L. Emokpae and M. Abdallah, "Blockchain-Enabled and Data-Driven Smart Healthcare Solution for Secure and Privacy-Preserving Data Access," in IEEE Systems Journal, doi:10.1109/JSYST.2021.3092519.

[33] Lloyd E. Emokpae, Roland N. Emokpae Jr., Ese Bowry, Jaeed Bin Saif, Muntasir Mahmud, Wassila Lalouani, Mohamed Younis, and Robert L. Joyner Jr., "A wearable multi-modal acoustic system for breathing analysis", The Journal of the Acoustical Society of America 151, 1033-1038 (2022) doi.org/10.1121/10.0009487.

[34] S. Amiriparian, M. Schmitt, N. Cummins, K. Qian, F. Dong and B. Schuller, "Deep Unsupervised Representation Learning for Abnormal Heart Sound Classification," 2018 40th Annual International Conference of the IEEE Engineering in Medicine and Biology Society (EMBC), 2018, pp. 4776-4779, doi:10.1109/EMBC.2018.8513102.

[35] K. A. Babu and B. Ramkumar, "Automatic Recognition of Fundamental Heart Sound Segments from PCG Corrupted With Lung Sounds and Speech," in IEEE Access, vol. 8, pp. 179983-179994, 2020, doi:10.1109/ACCESS.2020.3023044.

[36] American Thoracic Society. (2002). ATS statement: guidelines for the six-minute walk test. American journal of respiratory and critical care medicine, 166 (1), 111-117. doi:10.1164/ajrccm.166.1.at1102.

[37] Podsiadlo, D., & Richardson, S. (1991). The timed "Up & Go": a test of basic functional mobility for frail elderly persons. Journal of the American geriatrics society, 39(2), 142-148. doi:10.1111/j.1532-5415.1991.tb01616.x.

[38] Guralnik, J. M., Simonsick, E. M., Ferrucci, L., Glynn, R. J., Berkman, L. F., Blazer, D. G., . . . & Wallace, R. B. (1994). A short physical performance battery assessing lower extremity function: association with self-reported disability and prediction of mortality and nursing home admission. Journal of gerontology, 49 (2), M85-M94. doi:10.1093/geronj/49.2.m85

What is claimed is:

1. A system for noninvasive monitoring and prediction of lung function in a patient with chronic obstructive pulmonary disease (COPD), the system comprising:
 a wearable harness having bilateral sensors, a first and second of which are configured, when the harness is worn by the patient, to be proximate to a left lung and a right lung of the patient, respectively, each sensor including:
  an acoustic sensor configured to produce an acoustic signal based on sounds in an environment of the acoustic sensor,
  an inertial change sensor configured to produce an inertial change signal based on a change in inertia of the inertial change sensor,
  a microprocessor coupled to the acoustic sensor and inertial change sensor, configured to process the acoustic signal into phonocardiogram data and integrate the inertial change signal into z-axis data, said data comprising sensor data, and
  a wireless communication module coupled to the microprocessor, configured to transmit sensor data via a communications channel; and a remote server, configured to receive the sensor data from the bilateral sensors via the communications channel and configured with a machine learning (ML) algorithm to perform feature extraction from the sensor data by applying frequency analysis and normalization to said sensor data, including extraction of passive acoustic features Respiratory Rate (RR), Inhalation Duration (ID), Exhalation Duration (ED), Mean Airflow Velocity (AFV), Duration of Pauses (DP), Spectral centroid (SC), and Spectral bandwidth (SB), and prediction of a forced expiratory volume in one second (FEV1) and a forced vital capacity (FVC) of the patient based on the extracted features, wherein said ML algorithm has been trained with spirometry data.

2. The system of claim 1, wherein the remote server is further configured to compute a phonopulmogram (PPLG) waveform by combining the phonocardiogram data and the z-axis data from the bilateral sensors and to generate a representation of respiratory cycles and I: E ratios of the patient and wherein the bilateral sensors are adaptable for continuous monitoring in clinic and nonclinic settings.

3. The system of claim 1, wherein the acoustic sensor comprises an array of microphones.

4. The system of claim 1, wherein the inertial change sensor comprises a three axis accelerometer.

5. The system of claim 1, wherein the remote server is further configured to determine breathing pattern changes over a selectable period of time, wherein the selectable period of time may be selectable from periods of days, weeks, months, and years or bounded by a specified start date and by a specified end date.

6. The system of claim 5, wherein the remote server is further configured to identify exacerbated conditions related to the patient's COPD, including increased cough, shortness of breath, and changes in sputum production.

7. The system of claim 1, wherein the ML algorithm is trained using data gathered during a spirometry session of the patient and with spirometry data from multiple individuals with varying levels of COPD severity.

8. The system of claim 7, wherein the remote server is further configured to provide a reinforcement learning agent, trained to identify relevant features in the patient's sensor data for monitoring daily activities of the patient, and the identified features are used to develop a personalized model for the patient and wherein the reinforcement learning agent is rewarded for accurately predicting daily activities of the patient based on the data collected from the bilateral sensors using a Q-learning algorithm.

9. The system of claim 8, wherein the personalized model for the patient is continuously updated using learning algorithms based on data collected from the bilateral sensors.

10. The system of claim 7, wherein the remote server is further configured to determine and transmit a comprehensive assessment of the patient's functional status derived from the sensor data of the patient to a health care provider's dashboard.

11. The system of claim 7, further comprising a patient mobile device configured with a portal app to provide the patient with real-time feedback and visualizations of lung metrics, including real-time FEV1/FVC, I: E Ratio, RR, and HR outputs based on the sensors' data.

12. A system for noninvasive monitoring and prediction of lung function in a patient with chronic obstructive pulmonary disease (COPD), the system comprising:
a wearable harness having first and second sensors configured, when the harness is worn by the patient, to be proximate to a left lung and a right lung of the patient, respectively, each sensor including:
an acoustic sensor configured to produce an acoustic signal based on sounds in an environment of the acoustic sensor,
an inertial change sensor configured to produce an inertial change signal based on a change in inertia of the inertial change sensor,
a microprocessor coupled to the acoustic sensor and inertial change sensor, configured to process the acoustic signal into phonocardiogram data and integrate the inertial change signal into z-axis data, said data comprising sensor data, and
a wireless communication module coupled to the microprocessor, configured to transmit sensor data via a communications channel; and
a remote server, configured to receive the sensor data from each of the first and second sensors via the communications channel and configured with a machine learning (ML) algorithm to perform feature extraction from the sensor data by applying frequency analysis and normalization to said sensor data, including extraction of passive acoustic features Respiratory Rate (RR), Inhalation Duration (ID), Exhalation Duration (ED), Mean Airflow Velocity (AFV), Duration of Pauses (DP), Spectral centroid (SC), and Spectral bandwidth (SB), and prediction of a forced expiratory volume in one second (FEV1) and a forced vital capacity (FVC) of the patient based on the extracted features, wherein said ML algorithm has been trained with spirometry data;

further wherein the remote server is further configured to compute a phonopulmogram (PPLG) waveform by combining the phonocardiogram data and the z-axis data from the first and second sensors and to generate a representation of respiratory cycles and I: E ratios of the patient and wherein the first and second sensors are adaptable for continuous monitoring in clinic and nonclinic settings; and
further wherein the prediction of FEV1 and FVC are based on the PPLG waveform, I: E ratios, and acoustic features extracted from the phonocardiogram data, according to the equation:

$$FEV1/FVC = b0 + b_1 \cdot RR + b_2 \cdot ID + b_3 \cdot ED + b_4 \cdot AFV + b_5 \cdot DP + b_6 \cdot SC + b_7 \cdot SB.$$

13. A method for monitoring and prediction of lung function in a patient with chronic obstructive pulmonary disease (COPD) comprising the steps of:
disposing a wearable harness having first and second bilateral sensors configured, when the harness is worn by the patient, to be proximate to a left lung and a right lung of the patient, respectively, each sensor including:
an acoustic sensor configured to produce an acoustic signal based on sounds in an environment of the acoustic sensor,
an inertial change sensor configured to produce an inertial change signal based on a change in inertia of the inertial change sensor,
a microprocessor coupled to the acoustic sensor and inertial change sensor, configured to process the acoustic signal into phonocardiogram data and integrate the inertial change signal into z-axis data, said data comprising sensor data, and
a wireless communication module coupled to the microprocessor, configured to transmit sensor data via a communications channel;
transmitting the sensor data, by each of the wireless communications modules of the bilateral sensors;
receiving, by a remote server, the sensor data from each of the bilateral sensors via the communications channel; and
processing, by the remote server, the sensor data with a machine learning (ML) algorithm to perform feature extraction from the sensor data by applying frequency analysis and normalization to said sensor data, including extraction of passive acoustic features Respiratory Rate (RR), Inhalation Duration (ID), Exhalation Duration (ED), Mean Airflow Velocity (AFV), Duration of Pauses (DP), Spectral centroid (SC), and Spectral bandwidth (SB), and to predict a value representing a forced expiratory volume in one second (FEV1) and forced vital capacity (FVC) of the patient, wherein said ML algorithm has been trained with spirometry data.

14. The method of claim 13 further comprising a step of transmitting the patient's predicted FEV1 and FVC to a healthcare provider's device.

15. The method of claim 13 where said step of processing further comprises analyzing collected data to extract relevant passive acoustic features and predict forced expiratory volume in one second (FEV1) and forced vital capacity (FVC).

16. The method of claim 13 further comprising a step of training the ML algorithm with spirometry data from multiple individuals with varying levels of COPD severity and with data gathered during a spirometry session of the patient.

17. The method of claim 13 further comprising encrypting the sensor data prior to the transmitting step to create encrypted sensor data and decrypting the encrypted sensor data after the receiving step.

18. The method of claim 13 further comprising steps of determining breathing patterns changes or indicated exacerbations in the patient and transmitting the results of the determination step to a healthcare provider's device.

19. The method of claim 13 further comprising steps of determining a functional status of the patient and transmitting the result of the determination step to a healthcare provider's device.

20. The method of claim 13, further comprising a step of providing the patient a portal app for execution on a patient mobile device, said portal app configured to provide the patient with real-time feedback and visualizations of lung metrics based on the sensors' data.

* * * * *